United States Patent
Manz et al.

(10) Patent No.: US 11,772,047 B2
(45) Date of Patent: Oct. 3, 2023

(54) REVERSE OSMOSIS CENTRIFUGE

(71) Applicant: Eden Technologies, Inc., Washington, UT (US)

(72) Inventors: Hunter Ferdinand Manz, Washington, UT (US); Zachary Wayne Manweiler, St. George, UT (US); Olvian Manz, Las Vegas, NV (US)

(73) Assignee: Eden Technologies, Inc., Washington, UT (US)

(*) Notice: Subject to any disclaimer, the term of this patent is extended or adjusted under 35 U.S.C. 154(b) by 0 days.

(21) Appl. No.: 17/808,930

(22) Filed: Jun. 24, 2022

(65) Prior Publication Data
US 2022/0314169 A1 Oct. 6, 2022

Related U.S. Application Data

(63) Continuation-in-part of application No. 16/899,198, filed on Jun. 11, 2020, now abandoned.
(Continued)

(51) Int. Cl.
 *B01D 61/02* (2006.01)
 *B01D 61/08* (2006.01)
 (Continued)

(52) U.S. Cl.
 CPC .......... *B01D 61/06* (2013.01); *B01D 15/361* (2013.01); *B01D 61/025* (2013.01);
 (Continued)

(58) Field of Classification Search
 CPC .......... B01D 2317/022; B01D 2315/02; B01D 61/026; C02F 1/38; C02F 1/441; Y02A 20/131
 See application file for complete search history.

(56) References Cited

U.S. PATENT DOCUMENTS 3,717,554 A   2/1973   Ruthrof
4,230,564 A   10/1980  Keefer
(Continued)

FOREIGN PATENT DOCUMENTS

CN   102620462 A   *   8/2012
JP   S61234903 A        4/1985
(Continued)

OTHER PUBLICATIONS

Wang J—CN-102620462-A machine translation—Aug. 2012 (Year: 2012).*
(Continued)

*Primary Examiner* — Bradley R Spies
(74) *Attorney, Agent, or Firm* — Gurr Brande & Spendlove, PLLC; Robert A. Gurr; Robert D. Spendlove

(57) ABSTRACT

The reverse osmosis centrifuge converts rotational energy into fluid velocity and conserves the energy placed into the concentrate. As concentrate travels back towards the center of the reverse osmosis centrifuge, the velocity of the fluid is converted into rotational force, thus conserving energy. To accomplish this, the reverse osmosis centrifuge includes a stationary cylindrical housing having a vacuum chamber and a vacuum pump for generating vacuum pressure in the vacuum chamber, a driveshaft coupled to a membrane cylinder rotatable within the stationary cylindrical housing, the membrane cylinder having a plurality of vertical desalination membranes, and an energy recovery turbine. The reverse osmosis centrifuge can be placed on the concentrate or waste stream outlet of a desalination or reverse osmosis facility to increase freshwater production. Through using the methods described above, plant water production can be increased up to 40%, which in turn has a dramatic effect on plant profitability.

20 Claims, 28 Drawing Sheets

Related U.S. Application Data

(60) Provisional application No. 63/311,526, filed on Feb. 18, 2022, provisional application No. 62/859,786, filed on Jun. 11, 2019.

(51) Int. Cl.
  *B01D 63/16* (2006.01)
  *B01D 15/36* (2006.01)
  *B01D 61/06* (2006.01)

(52) U.S. Cl.
  CPC ........... *B01D 61/026* (2022.08); *B01D 61/08* (2013.01); *B01D 63/16* (2013.01); *B01D 2311/08* (2013.01); *B01D 2311/2623* (2013.01); *B01D 2313/243* (2013.01); *B01D 2313/246* (2013.01); *B01D 2313/90* (2013.01); *B01D 2317/022* (2013.01)

(56) References Cited

U.S. PATENT DOCUMENTS

| | | | |
|---|---|---|---|
| 4,333,832 A | 8/1982 | Siwecki et al. | |
| 4,886,597 A * | 12/1989 | Wild | B01D 63/16 210/321.68 |
| 6,132,613 A * | 10/2000 | Hopkin | C02F 1/441 210/321.83 |
| 6,972,113 B1 | 12/2005 | Ramshaw et al. | |
| 9,499,422 B1 | 11/2016 | Carson et al. | |
| 2002/0032110 A1 * | 3/2002 | Hunicke-Smith | G01N 35/028 494/84 |
| 2002/0184784 A1 * | 12/2002 | Strzala | H01F 27/14 34/60 |
| 2006/0065597 A1 | 3/2006 | Kunczynski | |
| 2007/0278146 A1 | 12/2007 | Cook | |
| 2009/0078640 A1 | 3/2009 | Chu et al. | |
| 2010/0044309 A1 | 2/2010 | Lee | |
| 2011/0247989 A1 | 10/2011 | Marelius | |
| 2013/0213870 A1 * | 8/2013 | Tempest, Jr. | C02F 9/00 210/259 |
| 2013/0277310 A1 * | 10/2013 | Okeljas, Jr. | C02F 1/441 210/97 |
| 2013/0284665 A1 | 10/2013 | Lee et al. | |
| 2014/0021134 A1 | 1/2014 | Lechuga Andrade et al. | |
| 2017/0001883 A1 * | 1/2017 | Yoshikawa | B01D 61/58 |
| 2018/0371578 A1 | 12/2018 | Liddell et al. | |
| 2020/0017378 A1 * | 1/2020 | Tikalsky | B01D 63/16 |
| 2020/0172994 A1 * | 6/2020 | Oraby | C22B 3/12 |
| 2021/0206658 A1 | 7/2021 | Budil | |

FOREIGN PATENT DOCUMENTS

| | | |
|---|---|---|
| JP | S61234903 A | 10/1986 |
| WO | 9836823 A1 | 8/1998 |
| WO | WO1998/036823 A1 | 8/1998 |
| WO | 2020252192 A1 | 12/2020 |

OTHER PUBLICATIONS

Sanchez S F—WO-9836823-A1 machine translation—Aug. 1998 (Year: 1998).*

* cited by examiner

REVERSE OSMOSIS CENTRIFUGE

CROSS-REFERENCE TO RELATED APPLICATIONS

This is a continuation-in-part of U.S. application Ser. No. 16/899,198, filed Jun. 11, 2020, which claimed the benefit of U.S. Provisional Application Ser. No. 62/859,786, filed on Jun. 11, 2019, and further claims priority to U.S. Provisional Application Ser. No. 63/311,526, filed on Feb. 18, 2022, all of which are incorporated herein by reference.

TECHNICAL FIELD

The present disclosure relates to desalination. More particularly, the present disclosure relates to a centrifugal system and method to aid in desalination of water.

BACKGROUND

Because human life depends upon fresh water, there is a constant need to find new sources or to uncover ways of producing fresh water. Due to the amount of saltwater on the planet, there is an obvious need to convert the salt water to fresh water. As a result, several desalination methods exist in the art, including ultrasonic methods, electrolysis, and other specialized pumping. However, these methods of desalination are very expensive, which prohibits them from being widely utilized. As a result, water shortages and droughts continue to exist for societies, even when those societies are next to oceans—our largest bodies of water. For example, California constantly faces water shortages and droughts despite being on the coast.

Much of the cost of desalination results from the energy consumption required to produce it. Most current methods of desalination rely on pressure. Currently, massive pumps are used to produce the pressure needed for desalination. As a result, these pumps consume a massive amount of energy, making them cost-prohibitive for many uses. Further, a majority of the energy placed into the system is lost in the saline concentrate produced as part of the filtration process. Accordingly, if a system and method could reduce the energy required to desalinate, the cost would decrease, thereby allowing wider use of desalinating technology and societies being less susceptible to droughts during dry seasons.

Centrifugal Reverse Osmosis has been introduced as a solution to one or more of the problems above. However, attempts at centrifugal reverse osmosis have failed to be successful in the marketplace. This may be the result of several factors, which may include the production amount of fresh water, the cost to replace current systems with reverse osmosis systems, placement of the system within the desalination plant, system design for ease of manufacturing, effective permeate water energy recovery, vacuum vapor suppression methods, or other barriers or problems.

Therefore, there remains a need for a system and method that can desalinate water at significantly reduced cost and that can prevent loss of energy in the system. Further, there is great need for a desalination system that may be added to current desalination systems, eliminating the need to replace equipment, and enhancing the freshwater production while keeping additional costs lower, among other needs. The present reverse osmosis centrifuge disclosed herein solves these and other problems.

SUMMARY OF EXAMPLE EMBODIMENTS

In some embodiments, a reverse osmosis centrifuge comprises a support shaft, a plurality of receiving tubes, a plurality of housings with filters therein, a plurality of departure tubes, and a permeate trough. The plurality of receiving tubes are coupled to a top of the plurality of housings, while the plurality of departure tubes are coupled to a bottom of the plurality of housings. As seawater enters the receiving tubes, it flows to the plurality of housings, where centrifugal force creates the permeate (i.e., fresh water) and concentrate (i.e., brine) in the plurality of housings. The permeate exits the plurality of housings and is deposited into the trough. The concentrate travels through, and exits from, the plurality of departure tubes.

In some embodiments, a reverse osmosis centrifuge comprises a rotatable housing having a water inlet and a plurality of water outlet arms, the rotatable housing being motor controlled. Each water outlet arm extends radially from the rotatable housing, the distal end of each arm comprising a saltwater outlet and a freshwater outlet. The reverse osmosis centrifuge further comprises a trough for receiving the output from the saltwater outlet and freshwater outlet, the trough divided so as to ensure separation of the fresh water from the saltwater. In some embodiments, the housing is an oblate spheroid. As a result, the water therein easily flows to the plurality of water outlets and through each arm. Pressure builds at the end of each arm due to rotational forces and the length of the arms. Accordingly, the rotationally-induced pressure (which may be referred to as "centrifugal" force) provides for desalination at a lower energy cost.

In some embodiments, a reverse osmosis centrifuge comprises a stationary cylindrical housing with a driveshaft extending longitudinally through the cylindrical housing; the driveshaft configured to rotate freely and comprising a water inlet at a first end and a concentrate outlet on a second end; a plurality of receiving tubes carries saltwater from the water inlet to a plurality of vertical desalination membranes configured to separate freshwater from saltwater; the desalination membranes are coupled to the driveshaft via one or more support arms; as the driveshaft rotates, the plurality of membranes likewise rotate inside of the cylindrical housing; a vacuum pump reduces windage and other oppositional forces, allowing the rotor (i.e., driveshaft coupled to desalination membranes) greater spinning efficiency; freshwater exits through a plurality of freshwater outlets at the bottom of the desalination membranes and saltwater travels from the desalination membranes to the concentrate outlet via a plurality of saltwater membrane lines; an energy recovery turbine is positioned below the freshwater outlets and is configured to spin independently and at a reduced speed as compared to the driveshaft; as freshwater exits, the force spins the energy recovery turbine which is geared to the drive shaft and/or produces electricity via an alternator; or is tied to that axle via a mechanical gear train, where the turbine rotates at a fixed, reduced speed. The freshwater may be pumped from within the housing via a pump; and a vacuum turbine is coupled to the rotor to deflect and thereby prevent water vapor from rising inside the housing.

In some embodiments, a system for desalination comprises a reverse osmosis centrifuge coupled to the waste stream of a reverse osmosis system, the reverse osmosis centrifuge further desalinating the received waste stream, thereby producing additional freshwater that exits out one or more freshwater outlets and saltwater concentrate passing to one or more holding tanks, to additional treatment systems or other facilities, or back to the ocean. In some embodiments, Molecular Recognition Technology is performed on the concentrate of the holding tanks.

DETAILED DESCRIPTION OF EXAMPLE EMBODIMENTS

Figure 1:
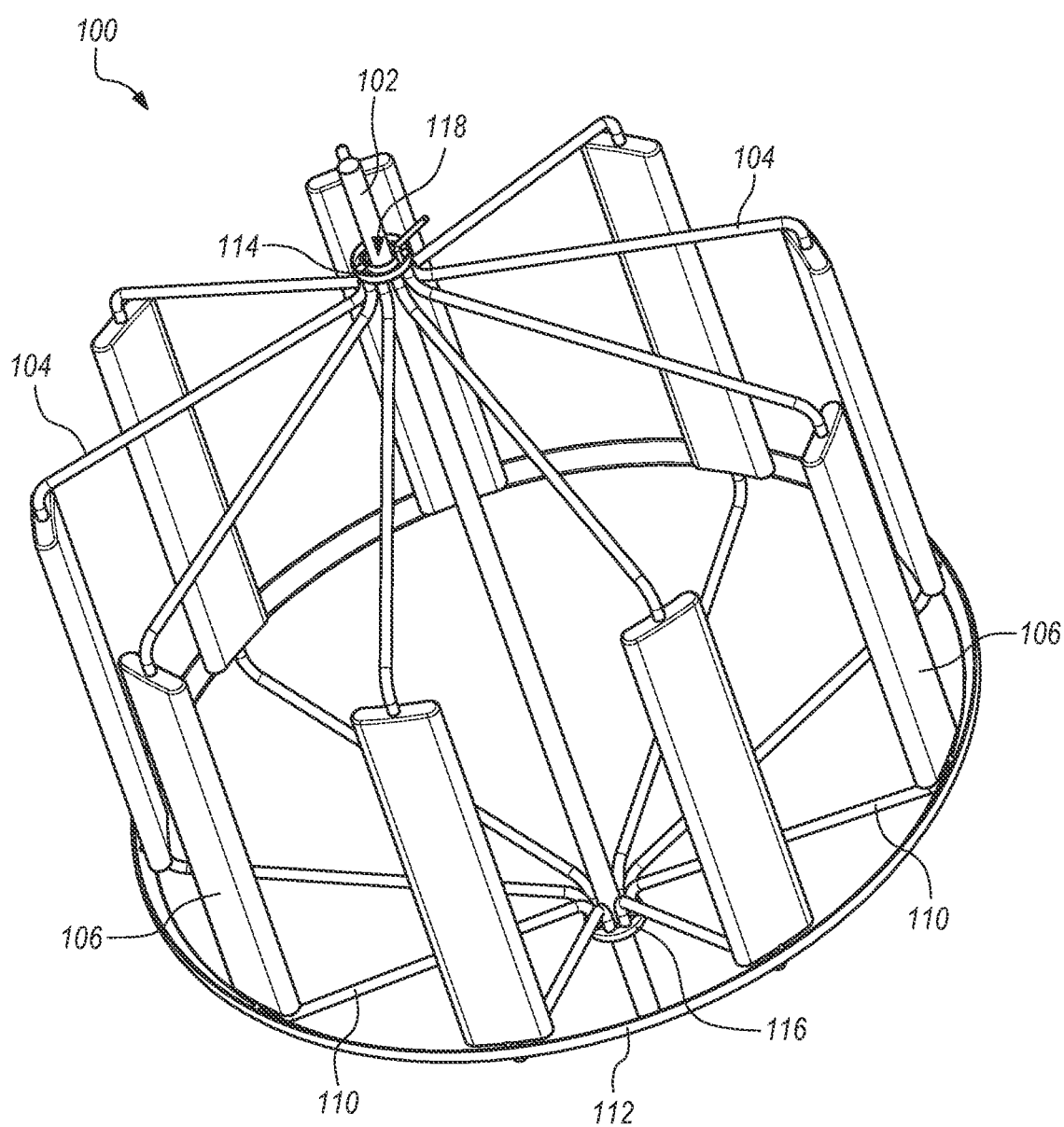
FIG. 1 illustrates a top perspective view of a reverse osmosis centrifuge.
Figure 2:
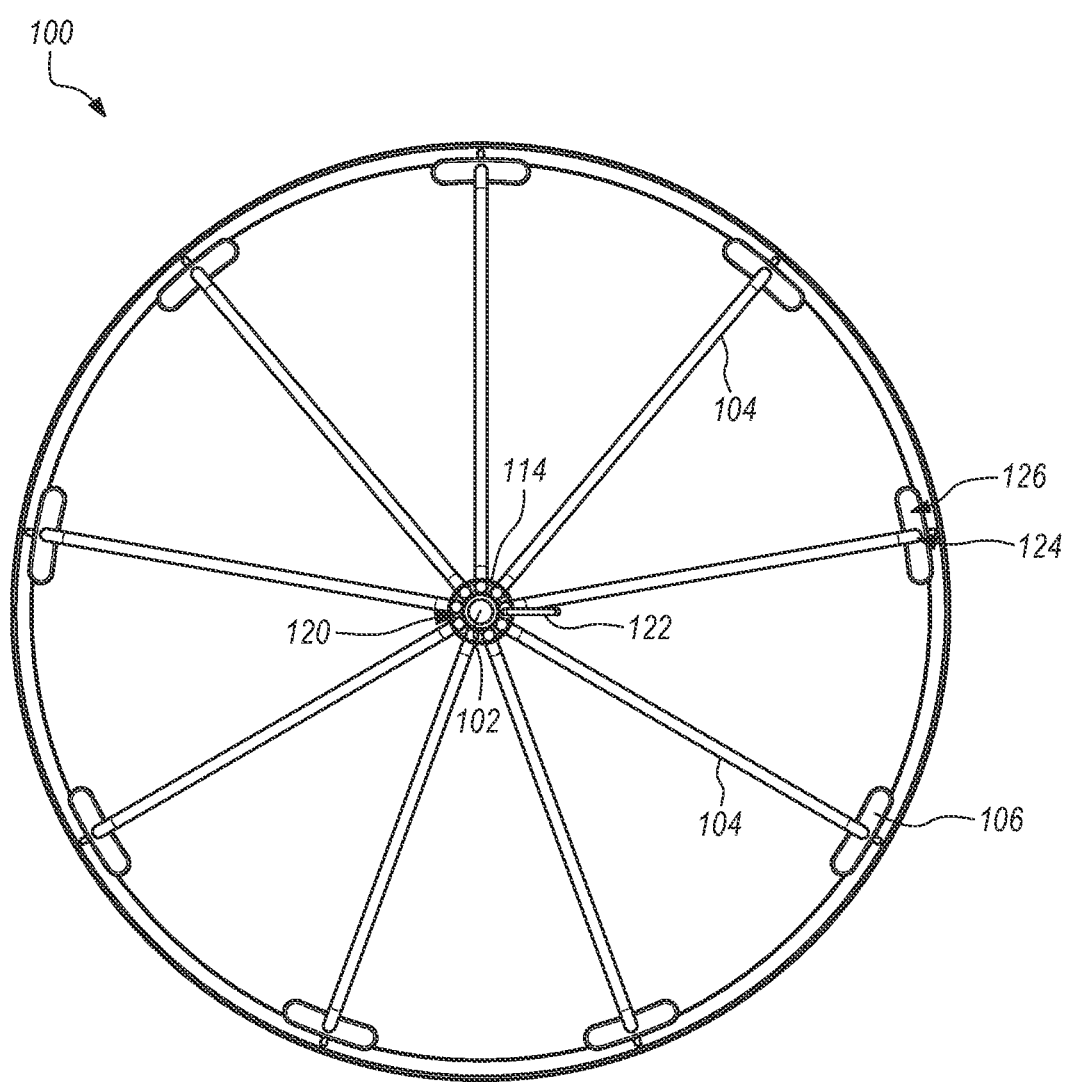
FIG. 2 illustrates a top plan view of a reverse osmosis centrifuge.
Figure 3:
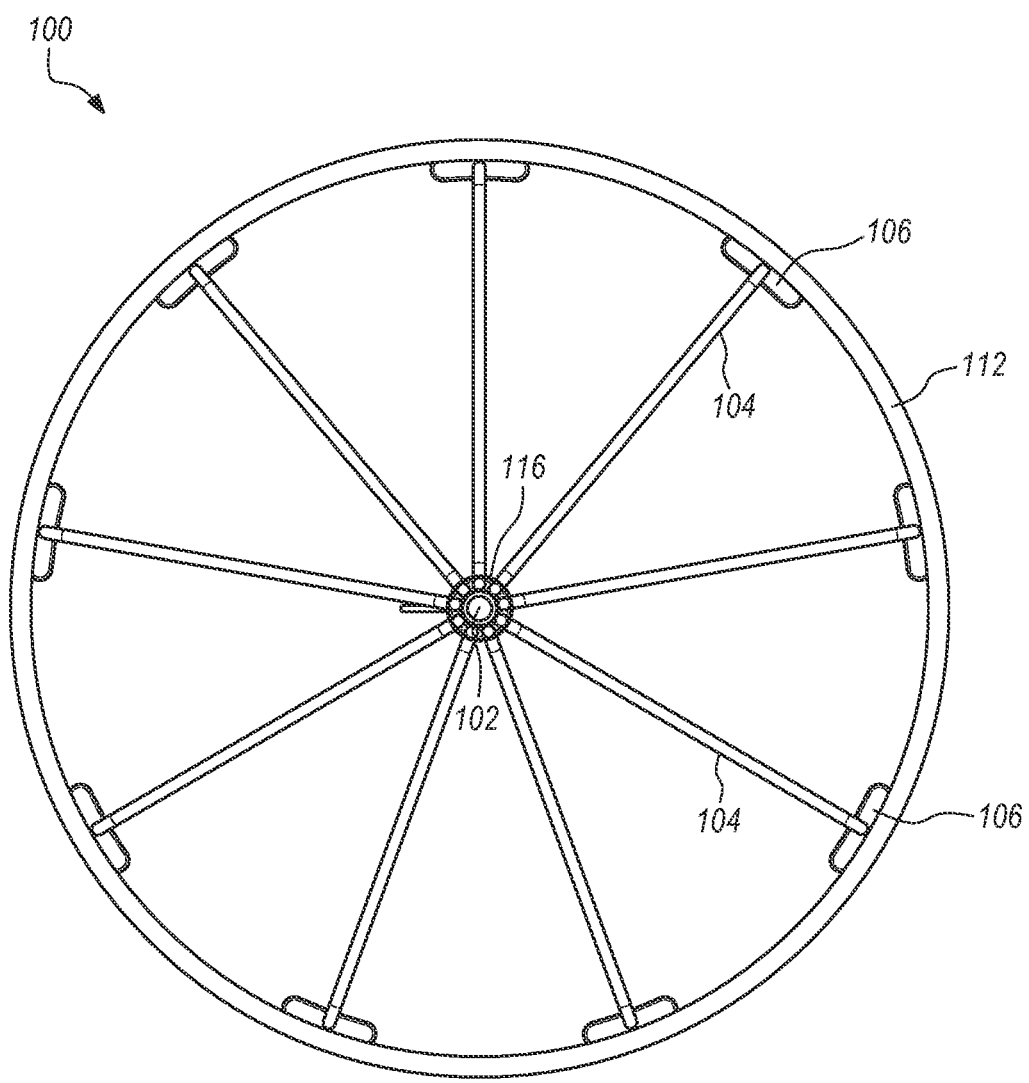
FIG. 3 illustrates a bottom plan view of a reverse osmosis centrifuge.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in some embodiments," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there remains a need for a system and method that can desalinate water at significantly reduced cost, increase freshwater production, and that can prevent loss of energy in the system. As will be appreciated from this disclosure, the reverse osmosis centrifuge solves these problems and others.

Typical reverse osmosis systems for desalination comprise a reverse osmosis train ("RO Train"), which may include an intake, a high-pressure pump, a filter separated from the pump, and an energy recovery device. Filters used in reverse osmosis are unique because they require "Cross Flow Filtration." To initiate the filtering process, the pump on typical RO Trains pushes salt water through the filter. With Cross Flow Filtration, a majority of the water mass moves across the filter, which is the saline concentrate. A desired feature of Cross Flow Filtration is that the large amount of concentrate acts as a cleanser as it moves across the filter, removing particles and prolonging the life of the filter. The water that does penetrate the filter is known as permeate and is often a small volume by percentage (e.g., 9%). The only valuable work produced by the reverse osmosis process is the permeate. However, energy is consumed by both the permeate and the concentrate. Because the concentrate is the waste product, the energy consumed by the concentrate is lost. To salvage some of the lost energy, energy recovery devices have been implemented in RO Trains. Energy recovery devices allow some of the energy that is placed into the system to be recovered. In particular, the energy recovery device was implemented in an attempt to transfer energy from the concentrate to the feed flow so as to not lose the majority of the energy consumed by the concentrate.

In contrast, the reverse osmosis centrifuge, described herein, generally conserves the energy of the concentrate by converting it to rotational energy. In some embodiments, the reverse osmosis centrifuge comprises a plurality of receiving tubes, a plurality of departure tubes, a support shaft, a plurality of housings with filters therein, and a trough. The plurality of receiving tubes are coupled to a top of the plurality of housings, while the plurality of departure tubes are coupled to a bottom of the plurality of housings. As seawater enters the receiving tubes, it flows to the plurality of housings, where centrifugal force creates the permeate and concentrate via the filters.

Centrifugal force (also known as a fictitious force) is an inertial force. This inertial force creates radial outward movement and pressure. Generally speaking, the faster an object is spinning, the greater the radially-outward force. This outward force creates pressure on seawater. The reverse osmosis centrifuge creates radial force on water entering the plurality of housings. The faster the plurality of housings spin, the greater the pressure. Unlike a RO Train, used in the prior art, where the pump is separated from the filter elements, the reverse osmosis centrifuge creates efficiencies by combining the pumping action and the filtration action into one revolving/centrifuge apparatus. Through the design of the reverse osmosis centrifuge, many major components of a RO Train become irrelevant. The two major components being replaced are the high-pressure pump and energy recovery device. Both of these devices are inherent features of the reverse osmosis centrifuge. It will be appreciated that the reverse osmosis centrifuge operates on the principle of taking water to a high pressure state, exhausting a fixed percentage of that water through the filters, and then recovering the energy in the concentrate water by taking it to a low pressure state before ejection through the plurality of departure tubes, thereby foregoing the need for an energy recovery device. Thus, and in stark contrast to the prior art, the reverse osmosis centrifuge is a cross flow filtration device that only exhausts energy into the filtered water (i.e., permeate) and not the concentrate.

Figure 4:
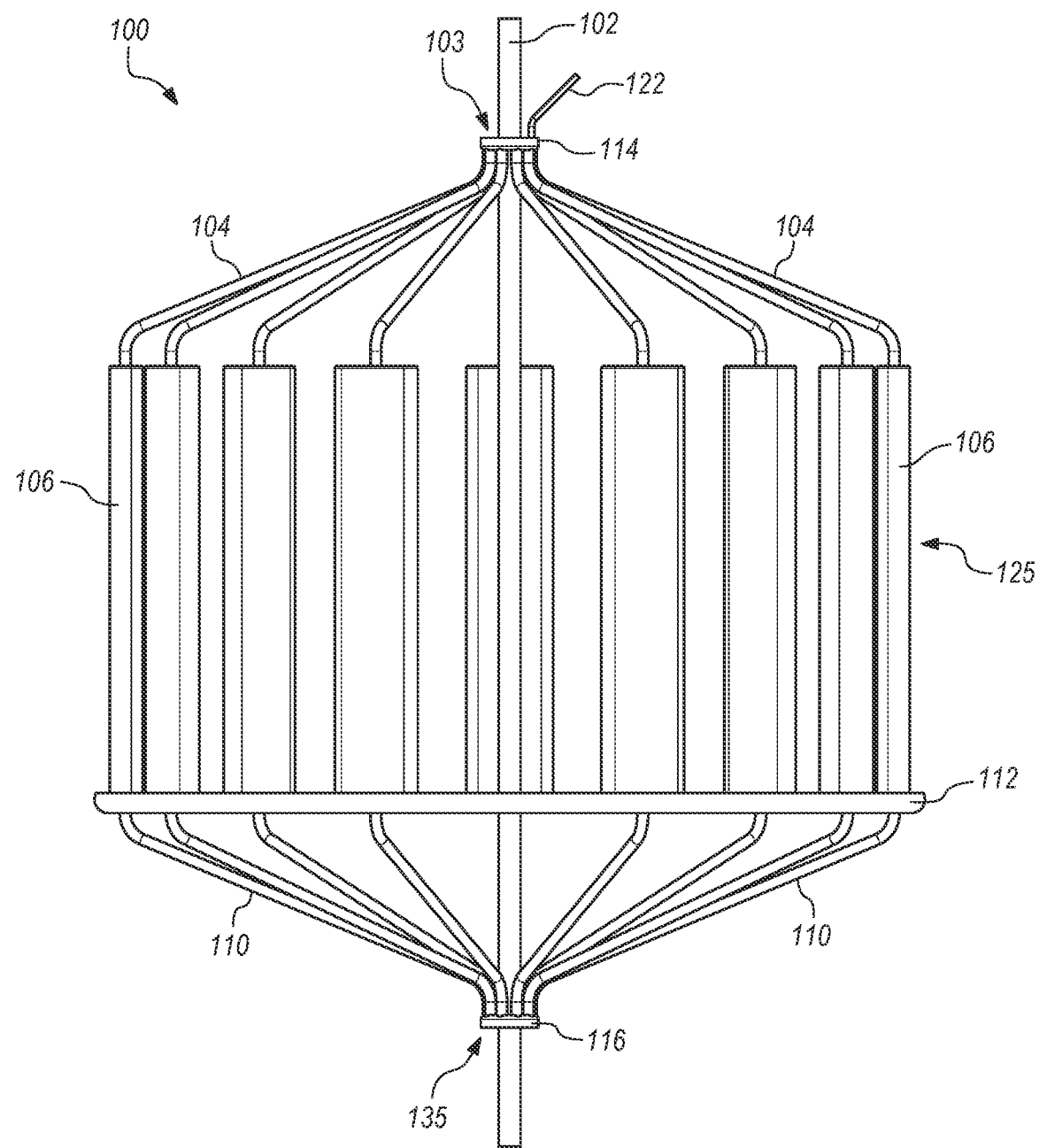
FIG. 4 illustrates a side elevation view of a reverse osmosis centrifuge.

As shown in FIGS. 1-5, in some embodiments, a reverse osmosis centrifuge 100 comprises a support shaft 102, a plurality of receiving tubes 104, a plurality of housings 106 with filters 108 (e.g., reverse osmosis membranes) therein, a plurality of departure tubes 110 for the outlet of concentrate, and a permeate trough 112. The reverse osmosis centrifuge 100 may be six feet in diameter and eight feet tall. However, the reverse osmosis centrifuge 100 is not limited to those dimensions and may be other dimensions, depending upon the available energy input and desired output amount. The support shaft 102 may receive a first trough 114 and a second trough 116. The support shaft 102 may rotate (e.g., motor-controlled), thereby rotating the first and second troughs 114, 116 coupled thereto. In an alternate embodiment, the support shaft 102 may be static while the first and second troughs 114, 116 have bearings and be motor-controlled so as to rotate around the support shaft 102. The first trough 114 comprises a first support shaft aperture 118 so as to receive the support shaft 102 at a first end 103 (FIG. 4). The first trough 114 further comprises a plurality of first apertures 120. While a plurality of apertures 120 are shown, it will be appreciated that one or more apertures may be used on the first trough 114. Further, the plurality of receiving tubes 104 are coupled to the plurality of apertures 120 via a securement mechanism, such as glue, crimping, twist and lock, threads, screws, etc.

When the reverse osmosis centrifuge 100 begins to operate, saltwater enters the first trough 114 by way of a fluid inlet 122. While saltwater may enter the reverse osmosis centrifuge 100, it will be appreciated that the reverse osmosis centrifuge 100 may be used with salt-free water as well. A single fluid inlet 122 is shown; however, there may be a plurality of fluid inlets so as to deposit additional saltwater into the system. The shape and form of the fluid inlet 122 may also vary. For example, the fluid inlet 122 may be non-angled and have a large diameter. Further, in some embodiments, the first trough 114 may be sealed with, for example, a cap so that water entering through a sealed fluid inlet 122 can pressurize the system, preventing backflow of the seawater and providing for the removal of the viscous concentrate from the plurality of departure tubes 110. In some embodiments, water entering the fluid inlet 122 may be pressurized, such as by using a pump.

Figure 5:
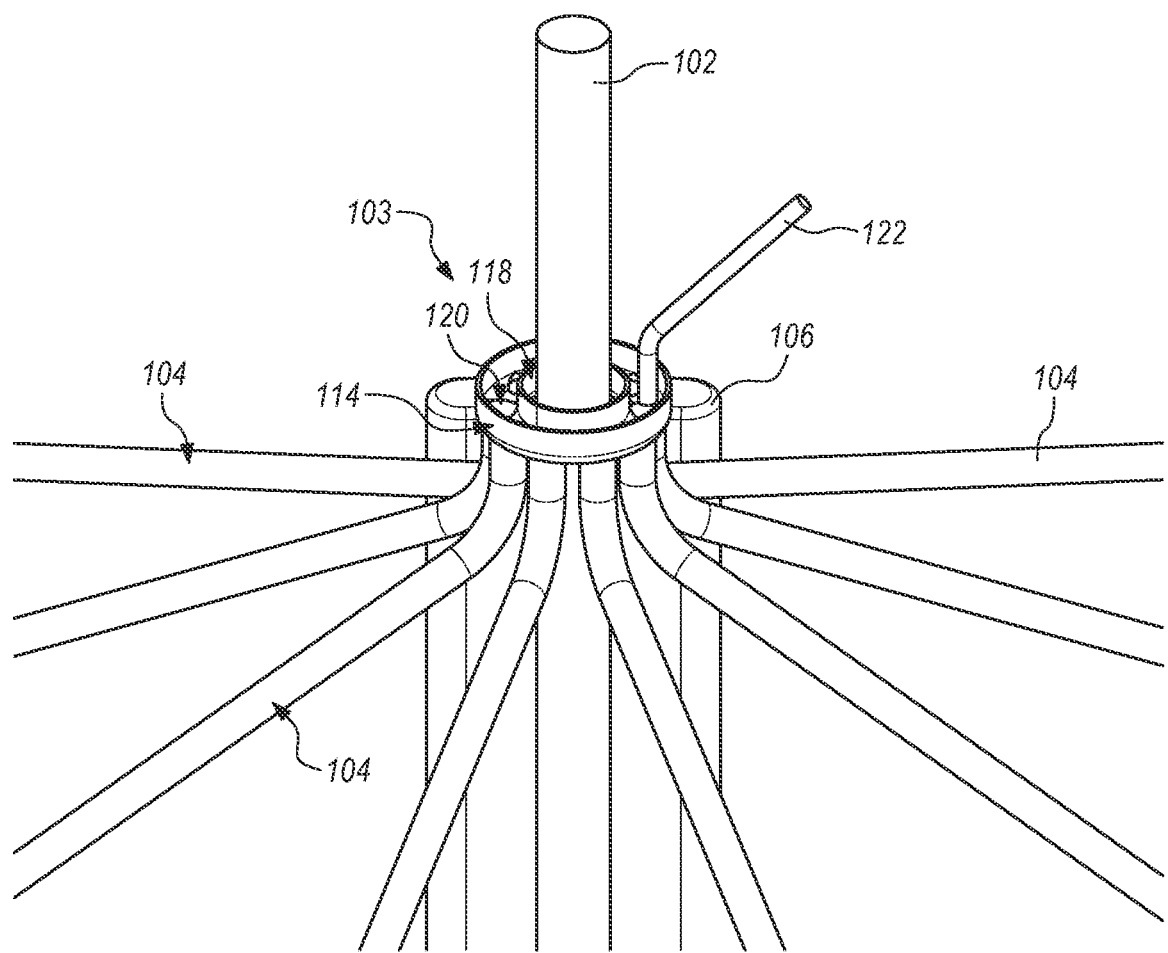
FIG. 5 illustrates a detailed, top perspective view of first trough and a fluid inlet of a reverse osmosis centrifuge.
Figure 6:
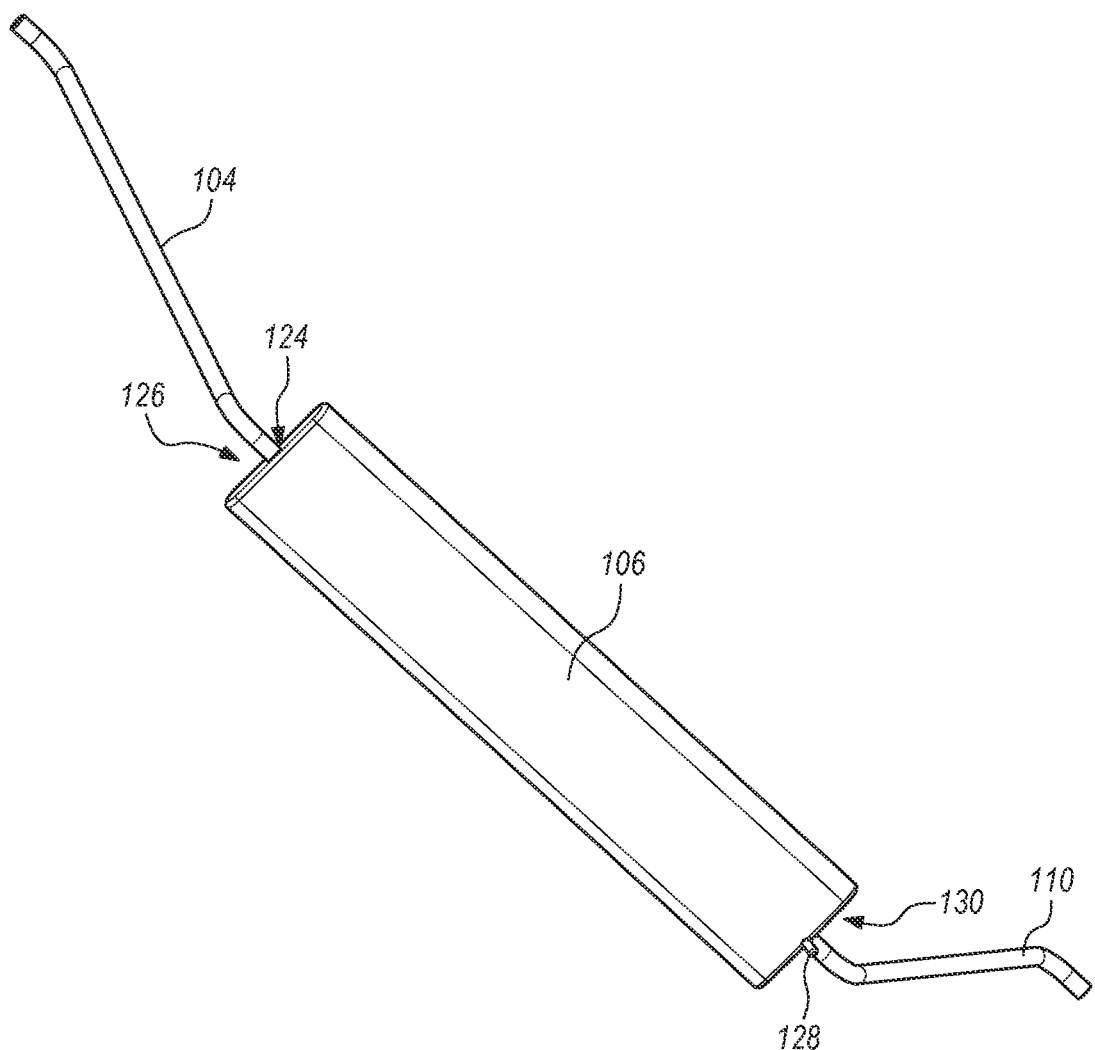
FIG. 6 illustrates a perspective view of a receiving tube, a housing, and a departure tube of a reverse osmosis centrifuge.

Referring to FIGS. 5-6, as saltwater enters the fluid inlet 122, it is deposited into the first trough 114 and flows into the plurality of receiving tubes 104. The plurality of receiving tubes 104 are also coupled to receiving apertures 124 on a top 126 of the plurality of housings 106. In a similar manner to the fluid inlet 122, the plurality of receiving tubes 104 may be a different shape, diameter, or both. The saltwater deposited into the plurality of receiving tubes 104 is eventually deposited into the plurality of housings 106, at a second position 125 that is radially distant to the shaft 102, via gravity and centrifugal force. The plurality of housings 106 may be vertically positioned, allowing gravity to induce the feed flow (flow of saltwater through the reverse osmosis centrifuge).

In some embodiments, the plurality of housings 106 may be stacked vertically to increase permeate production, while maintaining the same square footage. Further, in some embodiments, the plurality of housings 106 may have static turbines therebetween so as to drive feed flow. The plurality of housings 106 may be made of a fiberglass material that can compensate for pressure differential cycles during rotation, which creates better aerodynamics, structural resistance to a pressure differential, and vibration resistance. However, the plurality of housings 106 are not limited to fiberglass and may be other materials, such as aluminum, carbon fiber, plastic, etc.

In addition, the plurality of housings 106 may be a single unit that is seamless, airtight, and a smooth enclosure, thereby decreasing the windage effect. With the plurality of housings 106 being airtight, a body of air is sealed inside. At RPM, the body of air undergoes the same centrifugal and pressure gradient effects as the saltwater, forcing the air against the plurality of housings 106. If the plurality of housings 106 are not airtight, then unnecessary air consumption may occur. However, in some embodiments, the plurality of housings 106 may be multiple sealable components that may be removably attachable and adjustable.

Figure 7:
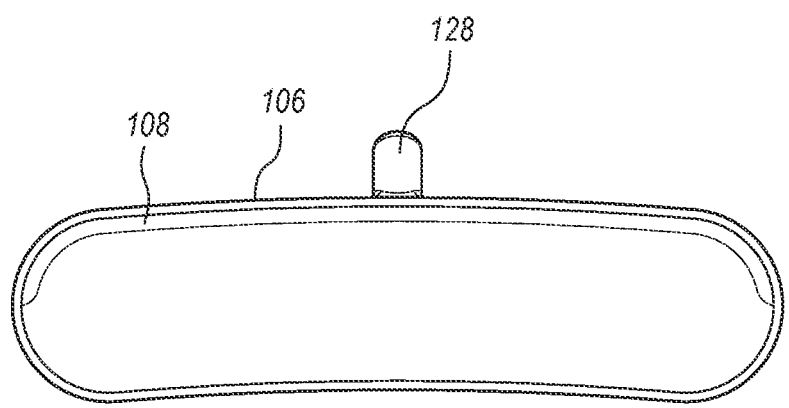
FIG. 7 illustrates a cross-sectional view of a filter and a housing of a reverse osmosis centrifuge.
Figure 8:
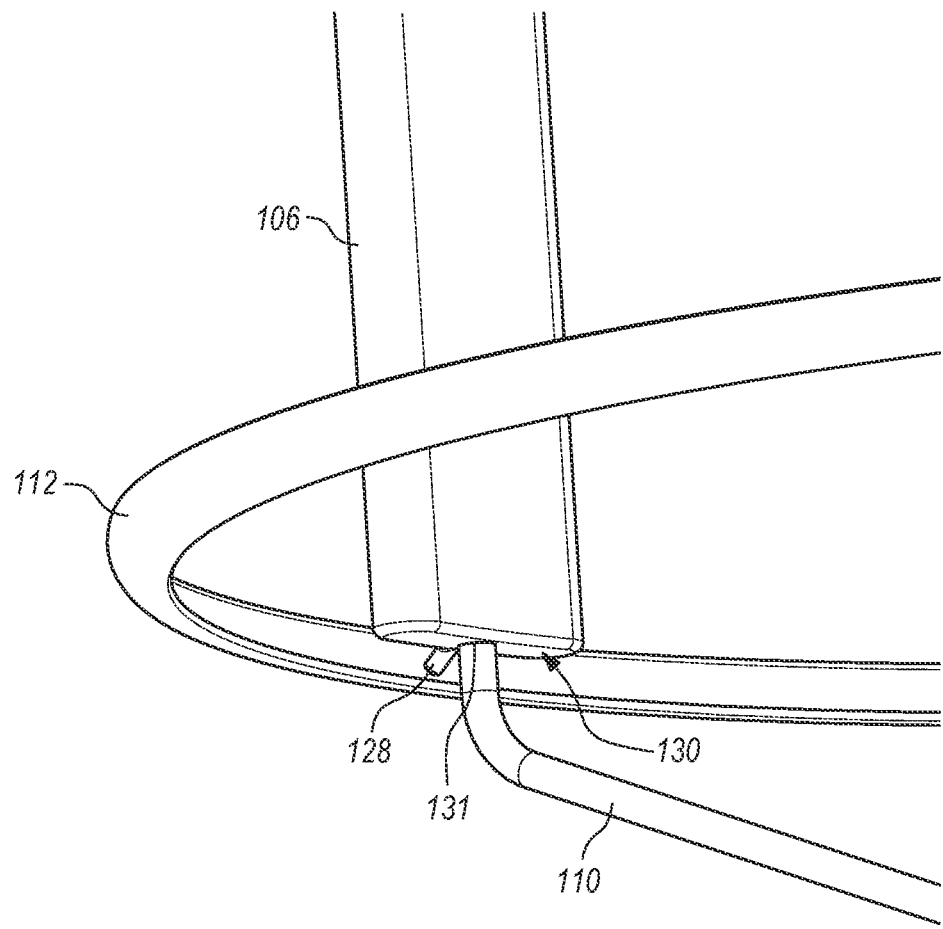
FIG. 8 illustrates a detailed, bottom perspective view of a housing and a permeate trough of a reverse osmosis centrifuge.

As shown in FIG. 7-8, the filter 108 may be positioned inside, and coupled to, the plurality of housings 106. The filter 108 may be coupled to the plurality of housings 106 with an attachment mechanism, such as glue. It should be noted that the filter 108 follows the contours of the plurality of housing 106. In other words, the curvature of the filter 108 and the inside of the plurality of housings 106 matches the curvature of the reverse osmosis centrifuge 100, which makes use of the pressure gradient effect. By compartmentalizing each filter 108 into an individual housing 106, centrifugal force can be easily transferred into the saltwater, rather than using a larger cylindrical filter known in the prior art. Centrifugal force creates pressure and pushes the saltwater into the filter 108. The saltwater flowing across the filter 108 becomes concentrate, while the salt water/feed flow is pressurized against the filter 108, and permeate is collected on the other side of the filter 108. The filter 108 may separate the concentrate and permeate flow paths. The filter 108 may be a graphene filter, a film composite membrane, a cellulose triacetate membrane, cellulose acetate, or any other type of filter. Further, the filter 108 may have fibers that are cylindrical, spiral, etc. It will be appreciated that the geometries of the filter 108 and the plurality of housings 106 allow the exact cross flow rate induced by gravity. In other words, the saltwater falls through the concentrate flow path in the filter 108 due to gravity. Because the first position 103 (centered at the axis) is in the highest position, and the second, radially distant position 125 (FIG. 4, distal end of the receiving tubes 104) is in a lower vertical position, gravity aids in the overall flow of the saltwater to the filter. Additionally, because the concentrate outlet is located at a third position 135, which is lower than both the first and second position 103, 125, respectively, gravity aids in the concentrate returning to the axis (shaft 102). However, a pump may also be used in some embodiments so as to increase the flow rate. The permeate is ejected through a permeate outlet 128, which is located at a bottom 130 (FIG. 8) of the plurality of housings 106, and into a permeate trough 112 where it may exit the reverse osmosis centrifuge 100.

Figure 9:
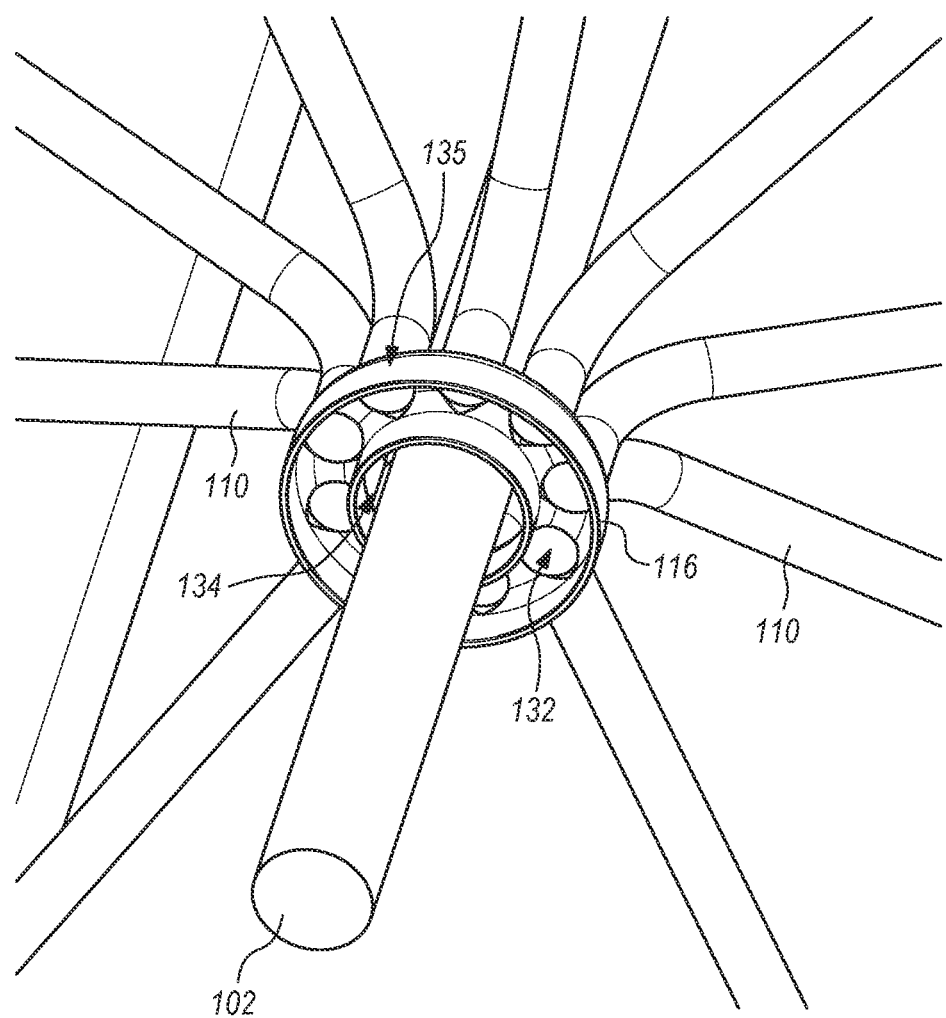
FIG. 9 illustrates a detailed, bottom perspective view of a second trough of a reverse osmosis centrifuge.

Referring to FIG. 9, while the permeate is deposited into the permeate trough 112, the concentrate is removed from the plurality of housings 106 by the plurality of departure tubes 110 that are coupled to the housings 106 by a plurality of departure apertures 131 (shown in FIG. 8). More specifically, the plurality of departure tubes 110 are coupled to the second trough 116 at a bottom of the reverse osmosis centrifuge 100, through a plurality of second apertures 132. The second trough 116 may also be coupled to the support shaft 102 via a second aperture 134, at a third position 135, which is vertically aligned with the first position 103. After the plurality of departure tubes 110 are coupled to the second trough 116, at the third position 135, the concentrate may exit therefrom. The plurality of departure tubes 110 may be a variety of shapes and sizes. In some embodiments, the diameter of the departure tubes 110 may be smaller in diameter than the diameter of the receiving tubes 104. This may be beneficial to aid in overcoming the loss of pressure due to the permeate that leaves the system. In other words, a smaller diameter departure tube 110 increases pressure to account for the pressure lost by the permeate, thereby bringing the system into equilibrium once again. Additionally, because the concentrate is denser than the incoming water in the receiving tubes 104, a higher pressure in the departure tubes 110 may be needed in some scenarios. Further, a pump may be utilized to increase the pressure in the departure tubes 110, either alone or in combination with smaller diameter departure tubes 110. Additionally, the angle of the plurality of departure tubes 110 may change depending on the dimensions of the reverse osmosis centrifuge 100.

Figure 10:
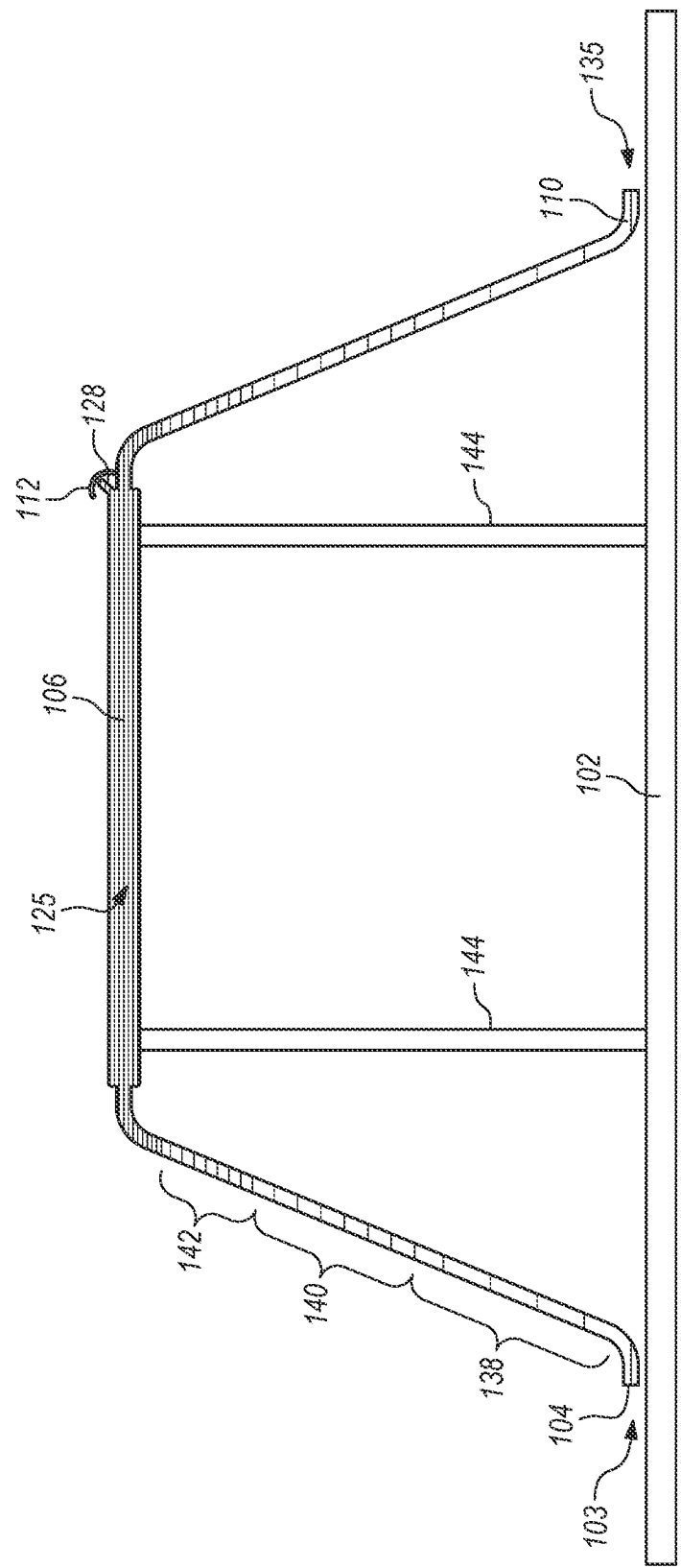
FIG. 10 illustrates a pressure gradient of a reverse osmosis centrifuge.

As shown in FIG. 10, the path of the feed flow resembles a "U" shape where the feed flow enters through the fluid inlet 122 at the first position 103. The flow path then gradually travels away from the first position 103, located on the vertical axis, to create more fluid pressure, where it reaches its max pressure at the plurality of housings 106 at the second position 125. The concentrate then gradually returns to center where it exits the plurality of departure tubes 110 at the second trough 116 at the third position 135 which is also located on the vertical axis. The objective of this geometry of the reverse osmosis centrifuge 100 is to maintain energy conservation in the feed flow. As the feed flow travels outward from the center, the centrifuge 100 adds energy to the fluid, which is manifested in a fluid velocity or centrifugal force. As the feed flow travels back towards the center, energy in the fluid is recovered through decreased velocity/centrifugal force, which aids in maintaining the rotation of the centrifuge 100. The necessary energy to drive the reverse osmosis centrifuge 100 is the difference between the quantities of feed flow traveling out versus in relative to the center of the reverse osmosis centrifuge 100. More specifically, when saltwater enters the plurality of receiving tubes 104, the saltwater is at a first, low pressure 138. As the saltwater travels down the plurality of receiving tubes 104, the pressure increases to a second, medium pressure 140 due to the rotational force. Lastly, after saltwater enters the plurality of housings 106, the saltwater is at a third, high pressure 142 (which occurs at second position 125) where it meets the filter 108 and is separated into two flow paths, permeate and concentrate. It will be appreciated that there is no mechanical wear or interfering surfaces in the high pressure region (second position 125) of the fluid, which may prevent wear on the reverse osmosis centrifuge 100. When the concentrate leaves the filter 108 and housing 106, it leaves in a reversed manner from how the saltwater entered. That is, from high pressure to low pressure as it is released via the plurality of departure tubes 110 at the third position 135. It should be noted that FIG. 10 illustrates an increase in pressure by the lines gradually becoming closer together as it moves away from the support shaft 102. In addition, referring to FIG. 10, the reverse osmosis centrifuge 100 may comprise support structures 144. The support structures 144 may be an aluminum, steel, or composite bracing. In some embodiments, the support structures 144 may be disks placed around the support shaft 102 and coupled to the plurality of housings 106. The support structures 144 may maintain the integrity of the apparatus when rotating so that the apparatus does not collapse or become otherwise damaged.

Figure 11:
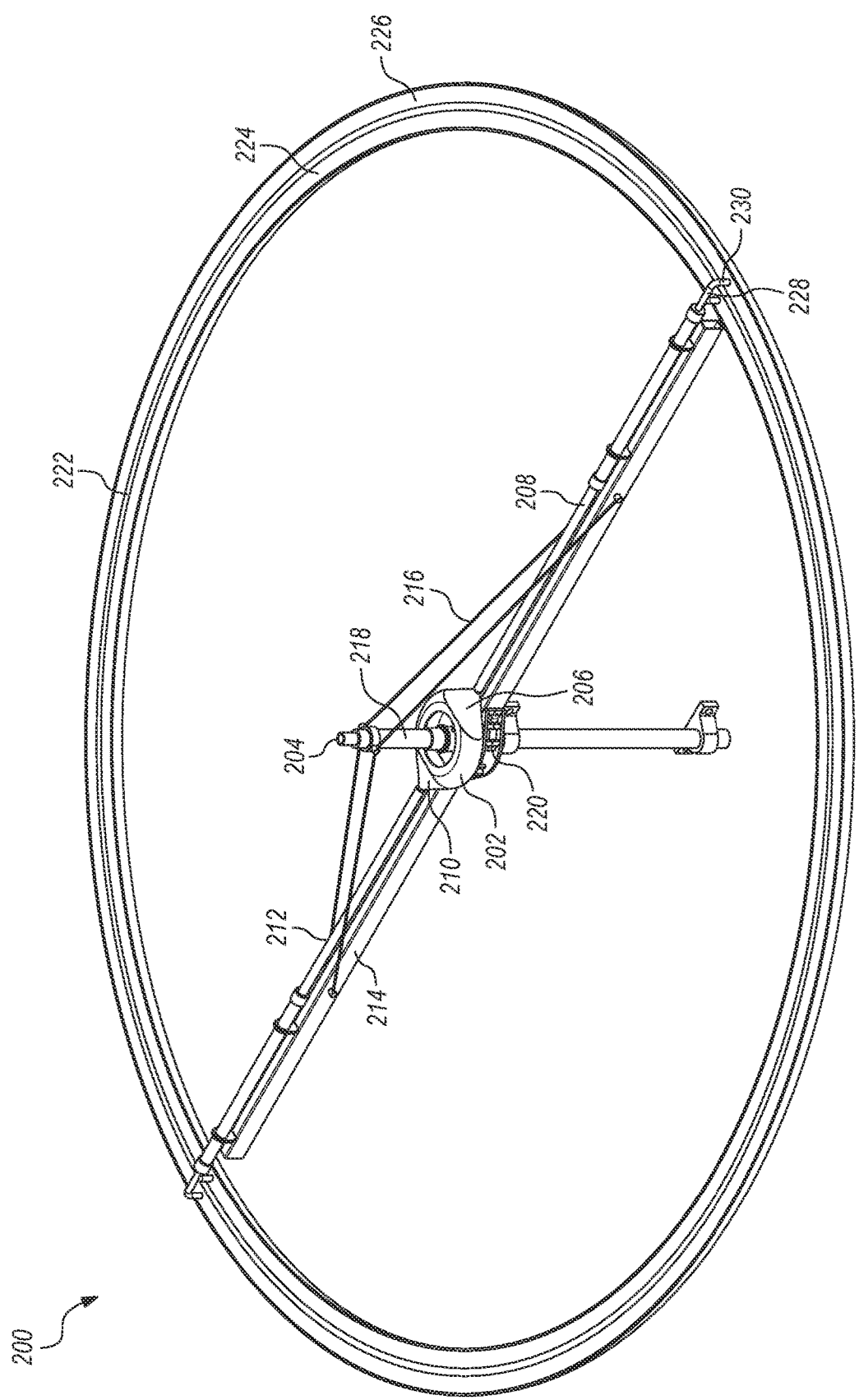
FIG. 11 illustrates a top perspective view of a reverse osmosis centrifuge.
Figure 12:
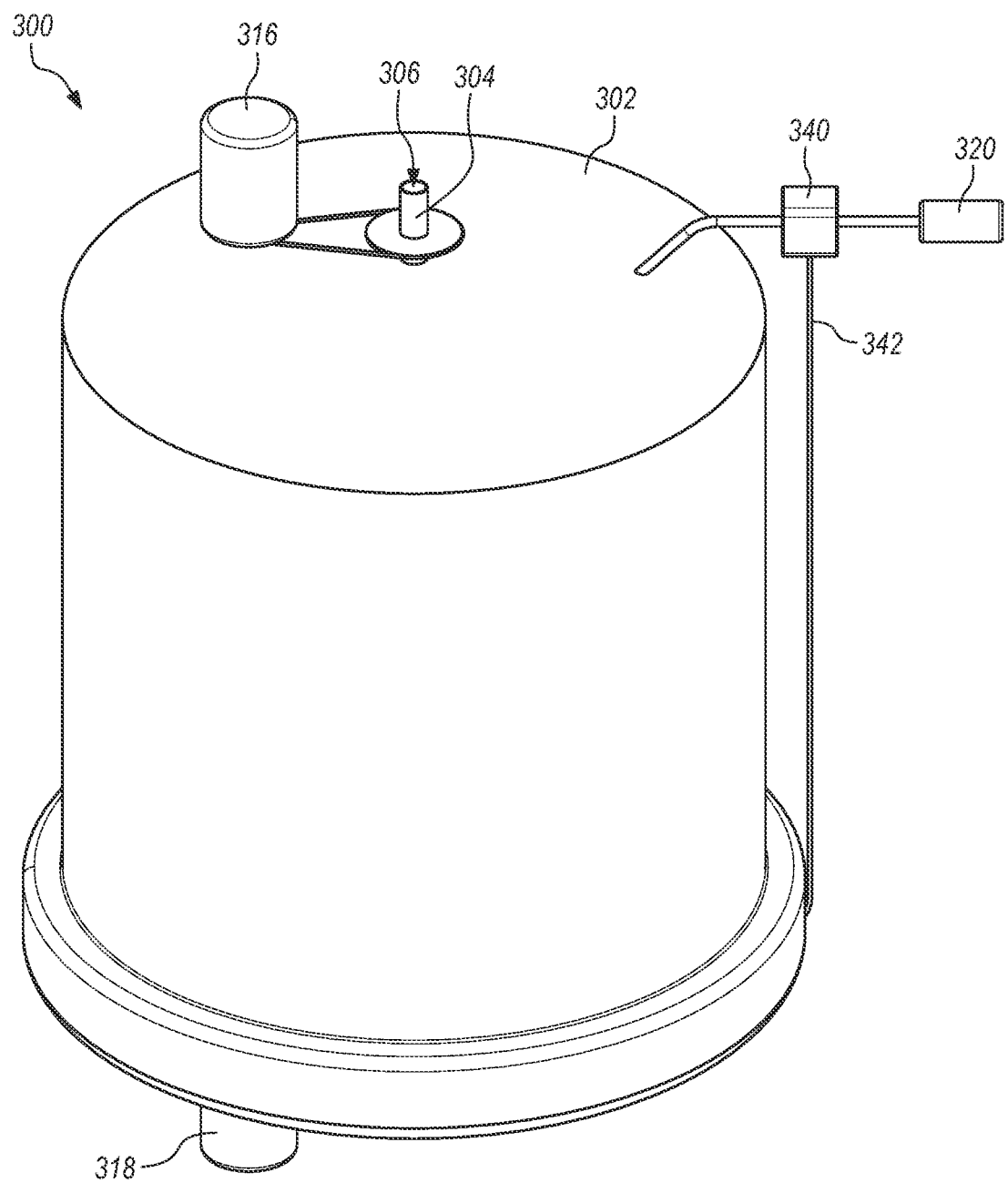
FIG. 12 illustrates a top, side perspective view of a reverse osmosis centrifuge.
Figure 13:
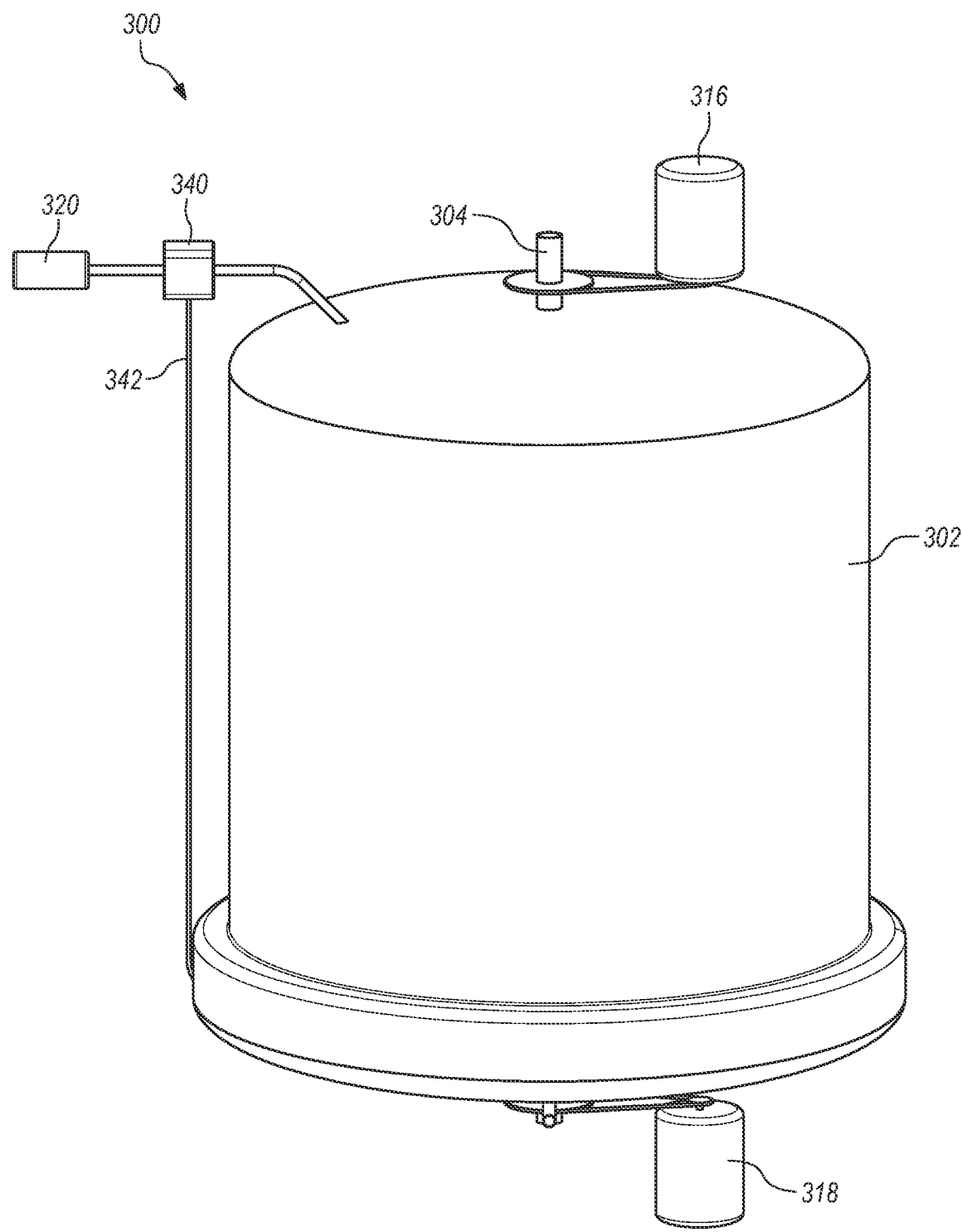
FIG. 13 illustrates a side perspective view of a reverse osmosis centrifuge.
Figure 14:
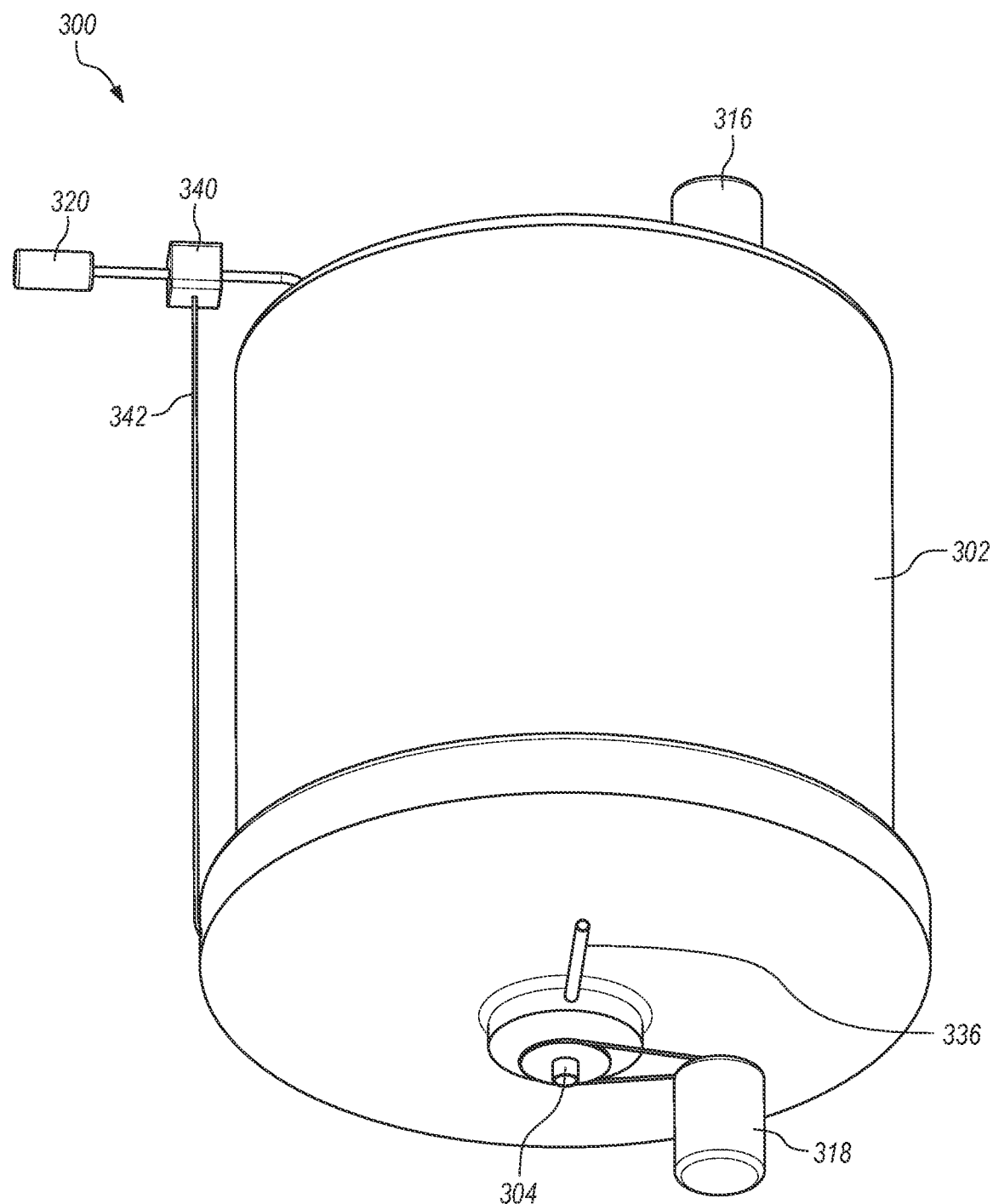
FIG. 14 illustrates a bottom perspective view of a reverse osmosis centrifuge.
Figure 15:
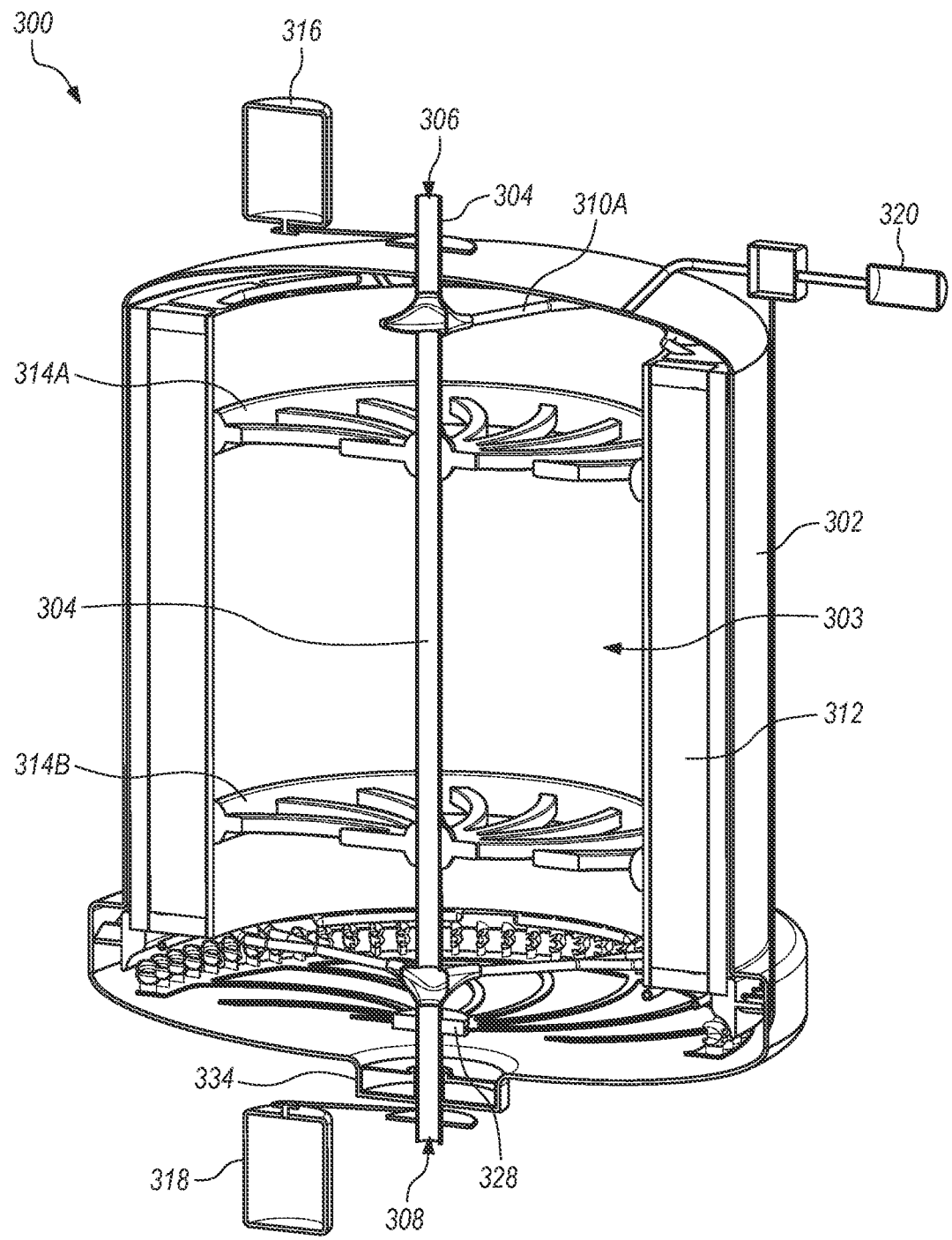
FIG. 15 illustrates a longitudinal cross-section of a reverse osmosis centrifuge.
Figure 16:
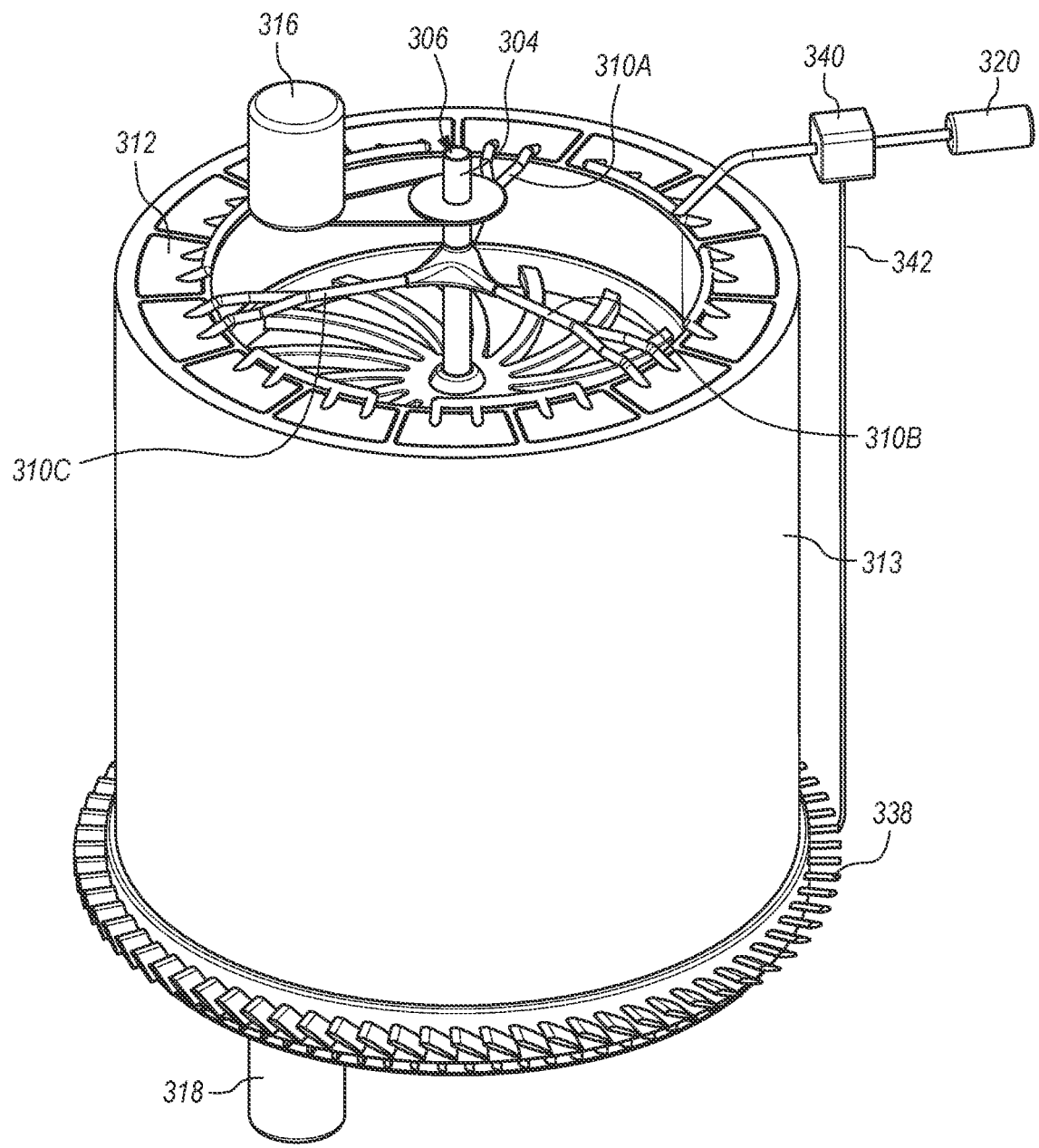
FIG. 16 illustrates a top perspective view of a of a reverse osmosis centrifuge with the housing removed.

The reverse osmosis centrifuge 100 requires no energy recovery device because the process of recovering energy from the concentrate is an inherent function of the reverse osmosis centrifuge 100 because the concentrate returns to the axis. To show this effect, an equation that returns the torque necessary to rotate the device at a given diameter, RPM/pressure, and flow rate is shown. The formula is $W=Q[Pgauge+(\frac{1}{2})p(Q^2/A^2)+(\frac{1}{2})p(w^2)(r^2)]$. This equation is a simplified application of the first Law of Thermodynamics. For example, at a 36" radius, 1097 rpm, 800 psi, and 6 gpm of flow, ~4.15 kw is required for continuous rotation. At an 18" radius, 3470 rpm, 2000 psi, and 20 gpm of flow, ~33 kw is required for continuous rotation. The examples above illustrate the torque necessary assuming no energy recovery is used with the system, which means that the concentrate and permeate are being ejected at the circumference of the reverse osmosis centrifuge 100, similar to what is shown in FIG. 11 and discussed later herein.

However, by moving the concentrate back to the center of the reverse osmosis centrifuge 100 by utilizing departure tubes 110, pressure/velocity is converted back into rotational energy. To illustrate this effect, a simple modification can be made to the flow rate equation. As an example, and to show the effect of the concentrate moving toward the center, at a 36" radius, there is 800 psi, 6 gpm of concentrate flow toward the filter, 0.25 gpm of permeate production, and 5.75 concentrate flow leaving the filter traveling back toward the radius. As long as the flow is moving outward, the flowrate is a positive number; if the flow is moving in the opposite direction, the flowrate is a negative number. For continuous rotation, ~4.15 kw is required for 6 gpm flow, and ~3.97 kw is required for 5.75 gpm return flow. 4.15 kw−3.97 kw=~0.18 kw (permeate energy consumption).

It should be noted that the difference between these two values is the energy required to produce the permeate. As shown and described above, the reverse osmosis centrifuge 100 only exhausts energy into the permeate production and none into the concentrate, which is a significant improvement over the prior art. In contrast, the prior art RO Trains exhaust energy into the permeate production and the concentrate, thus necessitating the use of an energy recovery device.

Further, the fluid pressure gradient is an inherent effect of the reverse osmosis centrifuge 100. At a given RPM, as fluid moves outward from the radius (i.e., axis), the fluid pressure increases. Pressure in the reverse osmosis centrifuge 100 is a function of the Specific Gravity of the solution, RPM, and the distance from the center of the axis. The following equation illustrates this relationship and the units are in Pa and Meters. The equation is PSI=5.4831 $(r^2)(RPM^2)$. As an example of how this equation is applied, at a 24"/0.6096 m radius, an RPM of 2708 is required to create 800 psi/5.5 MPA of fluid pressure. At a 96"/2.4384 m radius, an RPM of 411 is required to create 800 psi/5.5 MPA of fluid pressure. In the examples above, as the radius increases, the RPM necessary to create a given fluid pressure decreases, and as the radius decreases, the RPM must then increase. Those familiar with fluid dynamics will appreciate that there will be some variance in the formulas above due to temperature, viscosity, and other variables, but the above formulations illustrate the technology and may be adaptable to conditions by those in the art.

Therefore, in one method of use, saltwater enters the reverse osmosis centrifuge 100 at first position 103 located at the center, vertical axis (i.e., shaft 102). As the reverse osmosis centrifuge 100 rotates on the support shaft 102 (i.e., shaft 102 spins/rotates on its longitudinal axis), saltwater is forced radially outward through the plurality of receiving tubes 104. As the saltwater travels outwardly from the center, the water pressure increases and reaches its max pressure at the housings 106, located at a second position 125, containing the filter 108. The permeate then exits into the trough 112 and the concentrate returns to the center axis, at a third position 135, via departure tubes 110. Because the concentrate returns to center, its pressure is recovered prior to leaving the system. It will be appreciated that while receiving tubes 104 and departure tubes 110 are used as examples, other components (e.g., trays) and methods of moving water from a first, centered position, to a second, radially distant, position for filtering, and then returning concentrate to a third, centered position, may be used and do not depart herefrom.

In some embodiments, as shown in FIG. 11, a reverse osmosis centrifuge 200 comprises a substantially oblate spheroid housing 202 and water inlet 204. The housing 202 comprises a first funnel 206 coupled to a first outlet arm 208 and a second funnel 210 coupled to a second outlet arm 212. As a result, as the housing 202 spins, water is forced radially outward, where it is funneled through first funnel 206 and second funnel 210 to outlet arms 208, 212, respectively. As shown, the housing 202 and outlet arms 208, 212 may be supported by framework 214. Framework 214 may be supported using cables 216 that are coupled to center support 218. As appreciated, the support framework 214 spins with the housing 202. Again, water easily flows to the plurality of water outlets arms 208, 212 and pressure builds at the end of each arm due to rotational forces and the length of the arms 208, 212. Accordingly, the rotationally-induced pressure (which may be referred to as "centrifugal" force) provides for desalination at a lower energy cost since the rotational pressure is more easily sustained than traditional pump pressures. This is due to the use of bearings to aid in the rotation of the housing 202 and framework 214. In other words, the housing 202 and framework coupler 220 are able to rotate (i.e., spin) on the center support 218 through the use of bearings. Once the reverse osmosis centrifuge is spinning, it takes less energy to maintain the spinning than a traditional pump uses, particularly if high-quality, low friction bearings are used. As a result, pressure at the ends of arms 208, 212 is maintained with less energy input. Additionally, there is no mechanical wear or interfering surfaces in the high pressure region of the fluid. As water travels through each outlet arm 208, 212, pressure increases. Accordingly, a desalination membrane or filter is positioned toward the distal end of each outlet 208, 212 arm where pressure is the highest. The reverse osmosis centrifuge 200 may further comprise a trough 222 having a concentrate trough 224 and a permeate trough 226 for receiving the output from a concentrate outlet 228 and a freshwater outlet 230. As a result, the reverse osmosis centrifuge desalinates water at a reduced energy cost, which translates into a reduced monetary cost, making the desalinating technology more readily available. It should be noted that, as mentioned earlier, the reverse osmosis centrifuge 200 does not return the concentrate to center, and is therefore not as efficient as other embodiments described herein.

In some embodiments, a reverse osmosis centrifuge comprises a rotatable housing, having an oblate spheroid formfactor, having a water inlet and a plurality of water outlet arms. The rotatable housing is motor controlled so as to be easily rotatable (i.e., spinnable). As the rotatable housing spins, water in the rotatable housing is forced outward into the plurality of outlet arms. Each outlet arm extends radially from the rotatable housing. As water travels through each outlet arm, pressure increases. Accordingly, a desalination membrane or filter is positioned toward the distal end of each outlet arm where pressure is the highest. As a result, of the pressurized separation, concentrate exits a concentrate outlet and permeate exits the permeate outlets. The reverse osmosis centrifuge further comprises a trough for receiving the output from the concentrate outlets and permeate outlets, the trough divided into a concentrate trough and permeate trough so as to ensure separation of the permeate from the concentrate. The concentrate trough having a concentrate outlet and the permeate trough having a permeate outlet. In some embodiments, the concentrate trough is located near the axis of rotation.

In some embodiments, as shown in FIGS. 12-23 a reverse osmosis centrifuge 300 comprises a stationary cylindrical housing 302 with a driveshaft 304 extending longitudinally through the cylindrical housing 302. In some embodiments, the cylindrical housing 302 is sealed so as to create a vacuum chamber 303. The driveshaft 304 is configured to rotate freely, and may be sealed with the cylindrical housing 302 using a rotary union seal or other seal known in the art. The driveshaft 304 comprises a water inlet 306 at a first end and a concentrate outlet 308 at a second, opposite end. Saltwater enters through the water inlet 306 where it descends into a plurality of receiving tubes 310A-C coupled to the driveshaft 304. The receiving tubes 310A-C extend radially from the driveshaft 304 and carry saltwater from the water inlet 306 to a plurality of vertical desalination membranes 312 configured to separate freshwater from saltwater. The vertical desalination membranes 312 configured in a membrane cylinder 313 sized so as to be rotatable within the stationary cylindrical housing 302.

The traditional reverse osmosis membrane design resembles a spiral-wound sheet. Spiral-wound membranes are not designed to be subjected to significant centripetal accelerations (or G-Forces), but are designed to operate in a static environment. In typical reverse osmosis applications, concentration polarization is where the heavier particles, like salts and crystals, collect on the surface of the membrane where the filtration occurs. Once the membrane pores are clogged, the membrane fouls, and less freshwater is produced. In a centrifugal environment, the concentration polarization is more likely to occur on the surfaces that face the axis of rotation, rather than the membrane surfaces. If the membranes are oriented in a way where the membrane element extends radially from the axis of rotation, where the membrane elements are perpendicular to the axis of rotation (FIG. 28), an increase in permeate production could yield. This orientation would allow for the lower concentration solution to be positioned inward relative to the higher concentration solution. If the membranes are exclusively exposed to the lower concentration solution, higher permeate production can occur. This can be described as a "scouring" effect, which causes the heavier particles to be pulled away from the membrane element, thus concentrating on the outer wall of the housing.

The desalination membranes 312 are coupled to the driveshaft 304 via one or more support arms 314A-B. As a result, as the driveshaft 304 rotates, the plurality of desalination membranes 312 likewise rotate inside of the cylindrical housing 302. In some embodiments, a first motor 316 is coupled to a first end of the driveshaft 304 to rotate the driveshaft 304. In addition thereto, or in the alternate, a second motor 318 may be coupled to the driveshaft 304 at a second end.

In some embodiments, a vacuum pump 320 applies a vacuum to the internal vacuum chamber 303 of the cylindrical housing 302. A vacuum chamber 303 reduces windage and other oppositional forces, allowing the rotor-like components (i.e., driveshaft 304 coupled to desalination membranes 312) greater spinning efficiency. As a result, the motors 316, 318 require less energy to achieve a desired RPM. The energy required by the vacuum pump 320 is less than the energy required by the motors 316, 318 to overcome windage and drag, resulting in greater efficiency. If the level of vacuum is too high, the water can potentially boil at room temperature. The boiling point of water decreases as the vacuum increases. The vacuum chamber 303 and vacuum pump 320 maintains a partial vacuum to keep water in a liquid state while passing through the evacuated enclosure.

Saltwater is fed into the vertical desalination membranes 312 via the water inlet 306 and receiving tubes 310A-C. The rotational forces created by motors 316, 318 force the water outwardly into the desalination membranes 312. Pressure and gravity then force the saltwater through the vertical desalination membranes 312, where freshwater is separated from salt concentrate. The freshwater (permeate) exits through a plurality of freshwater outlets 322A-C (best seen in FIG. 17) at the bottom of the desalination membranes 312 and saltwater concentrate (brine) travels from the desalination membranes 312 to the concentrate outlet 308 via a plurality of concentrate departure tubes 324A-C (best seen in FIG. 18) that couple to the concentrate outlet 308.

In order to create the pressure required for desalination, the membrane cylinder 313 has to reach nominal RPM where the angular velocity of the water ejected from the membrane cylinder 313 can be up to 400 mph. Up to fifty percent of the energy exerted into freshwater production takes the form of this velocity. If a turbine is positioned to be driven by this water, a significant amount of energy can be recovered from the system. Accordingly, in some embodiments, an energy recovery turbine 326 is positioned below the freshwater outlets 322-A-C and is configured to spin independently of the driveshaft 304, such as by using bearings to couple it to the driveshaft 304. As freshwater exits the freshwater outlets 322A-C, the force of the water spins the energy recovery turbine 326. The energy recovery turbine 326 is geared to the driveshaft 304 via one or more gears 328, where it rotates at a fixed, reduced speed. As a result of this recapture of energy, the total energy lost in the system is reduced, resulting in higher efficiency. In some embodiments, the energy recovery turbine is coupled to an alternator to produce electricity, which may then be fed to the second motor 318. In some embodiments, the energy recovery turbine 326 comprises a plurality of cup-shaped blades 330 to receive the freshwater and induce spinning easier.

Figure 17:
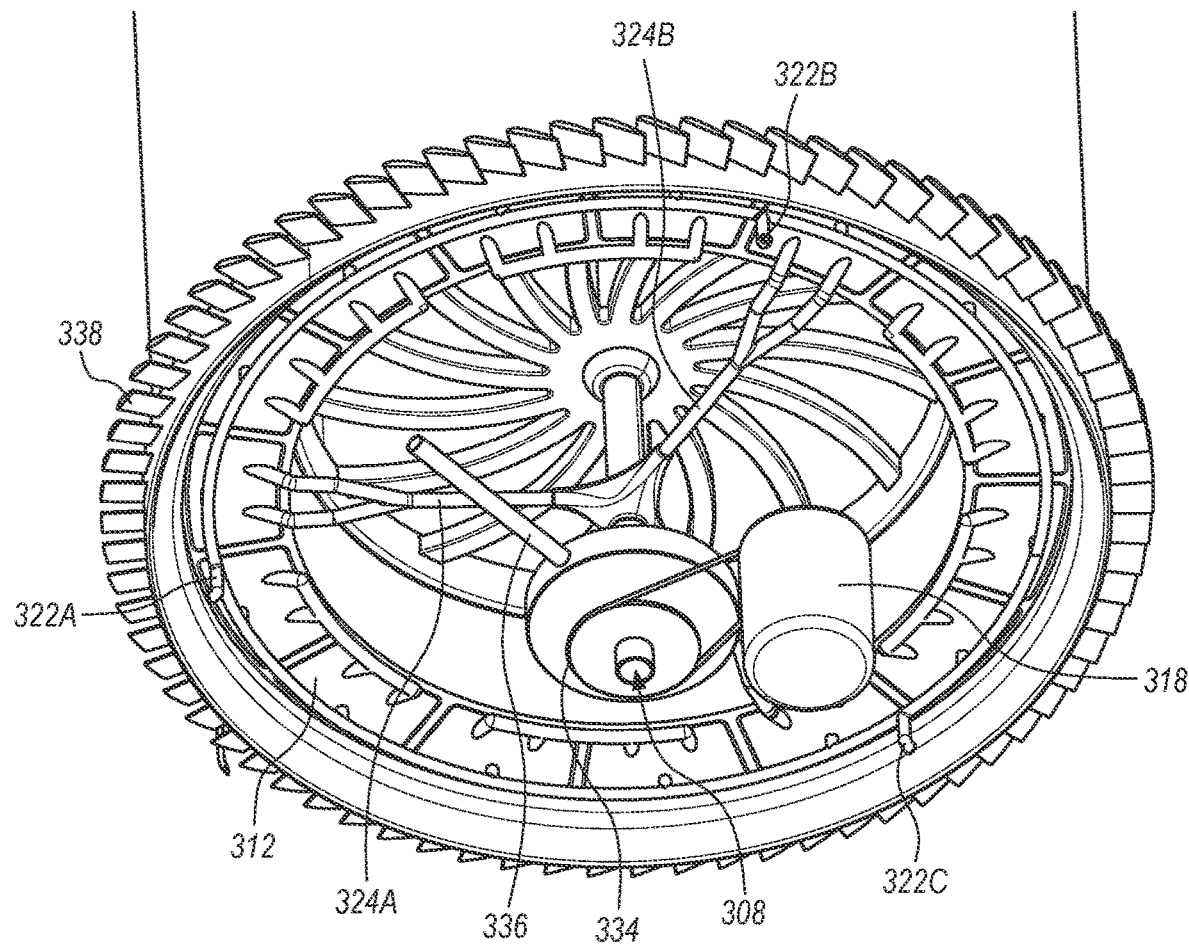
FIG. 17 illustrates a bottom, partial perspective view of a reverse osmosis centrifuge with a housing removed.
Figure 18:
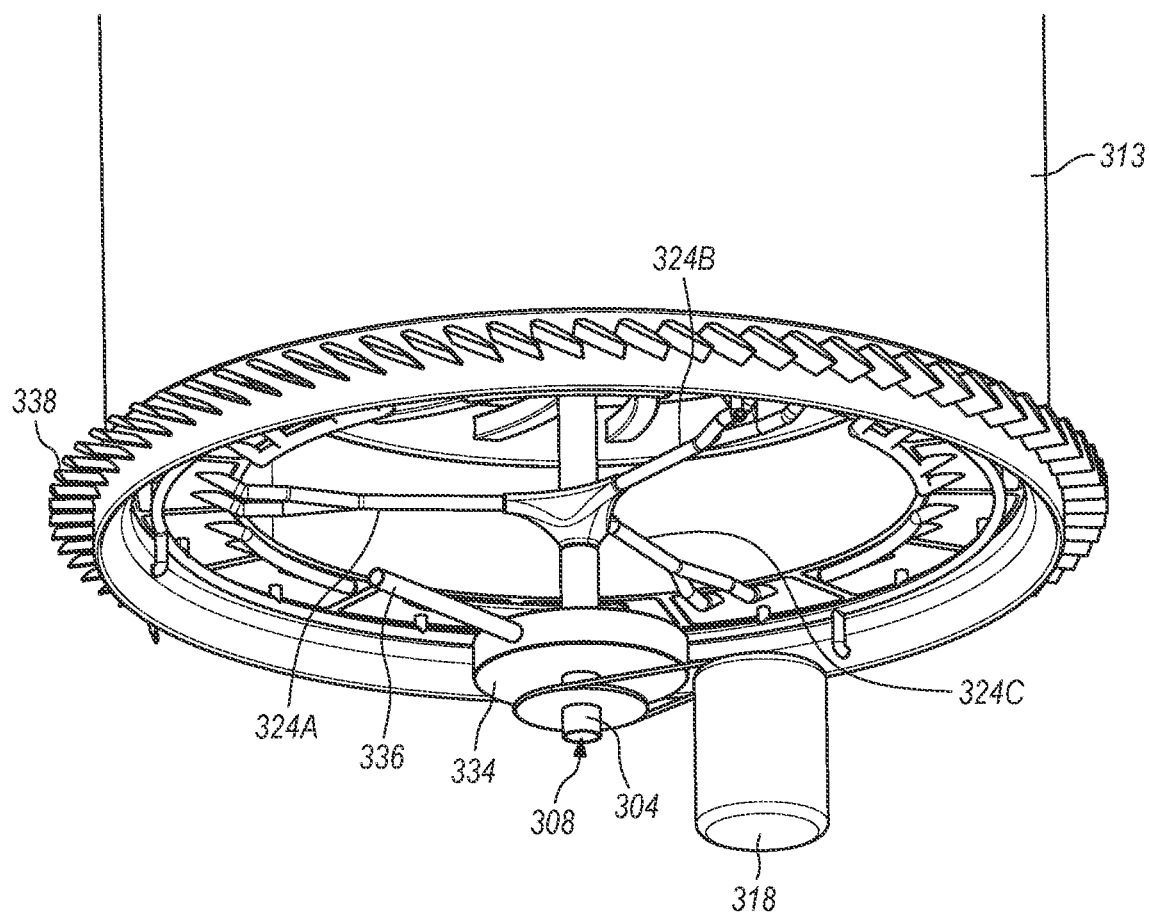
FIG. 18 illustrates a partial, bottom side perspective view of a reverse osmosis centrifuge with a housing removed.
Figure 19:
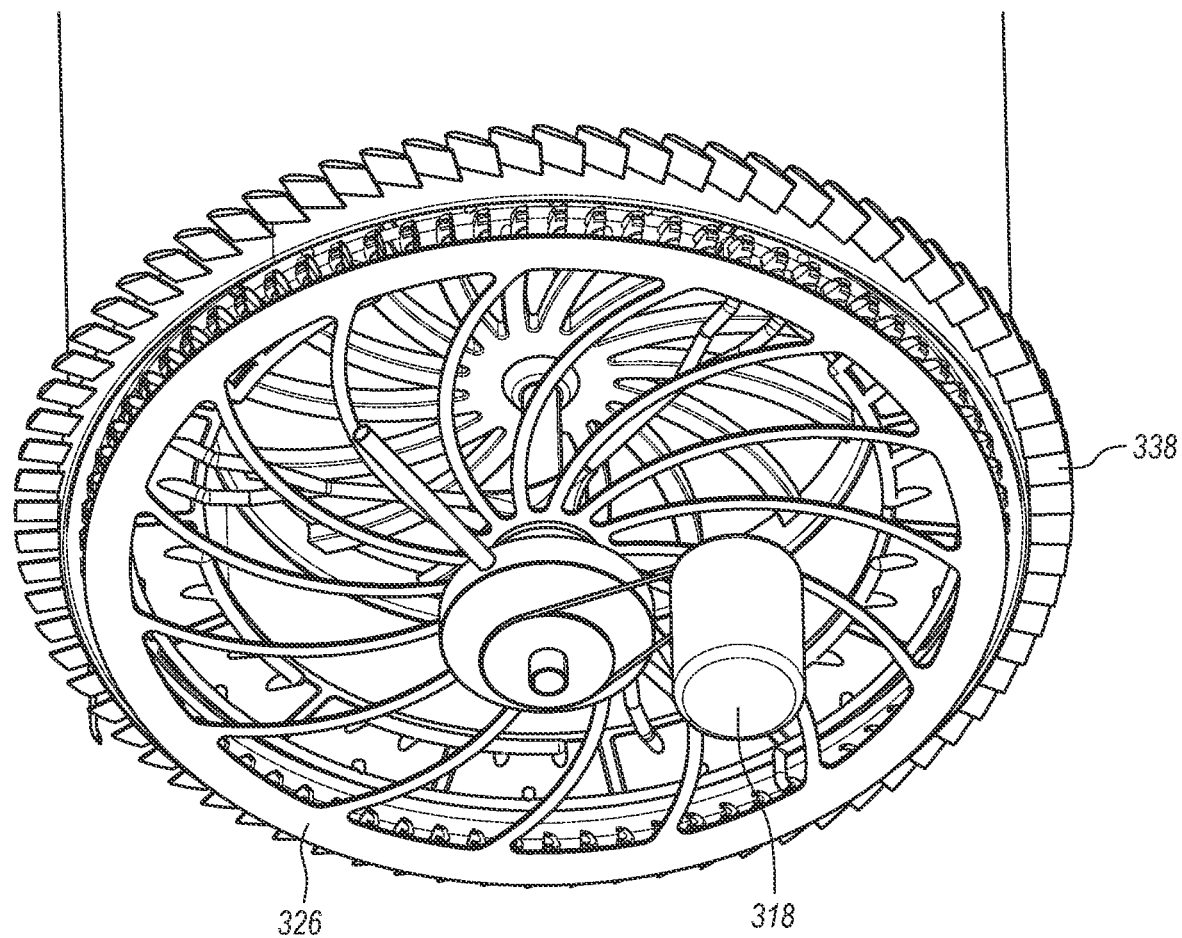
FIG. 19 illustrates a bottom, partial perspective view of a reverse osmosis centrifuge with a housing removed.
Figure 20:
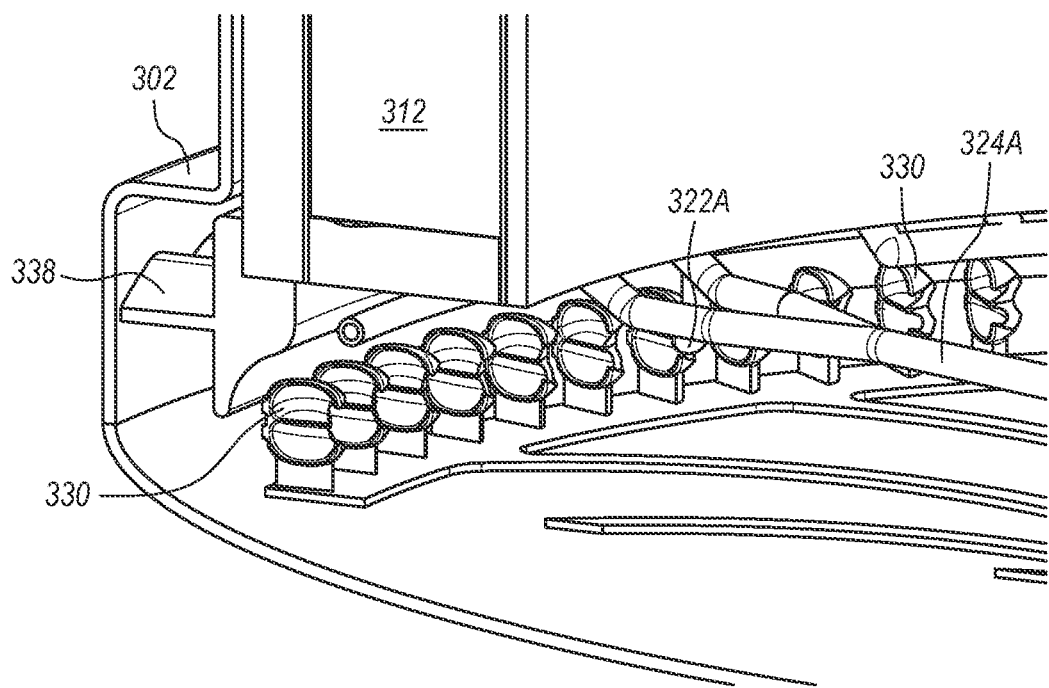
FIG. 20 illustrates a partial, detailed cross-section of a reverse osmosis centrifuge.
Figure 21:
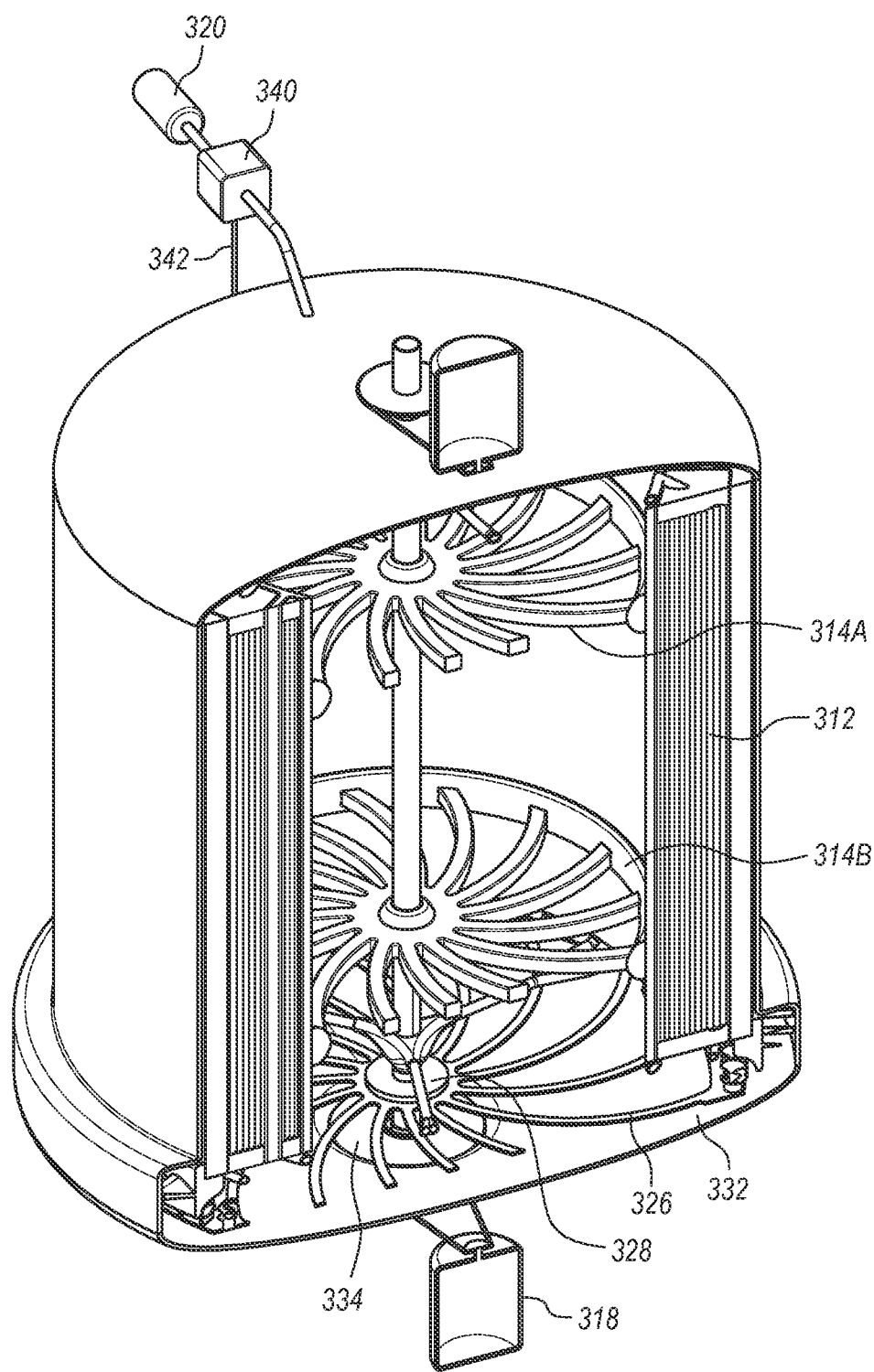
FIG. 21 illustrates a longitudinal cross-section of a reverse osmosis centrifuge.
Figure 22:
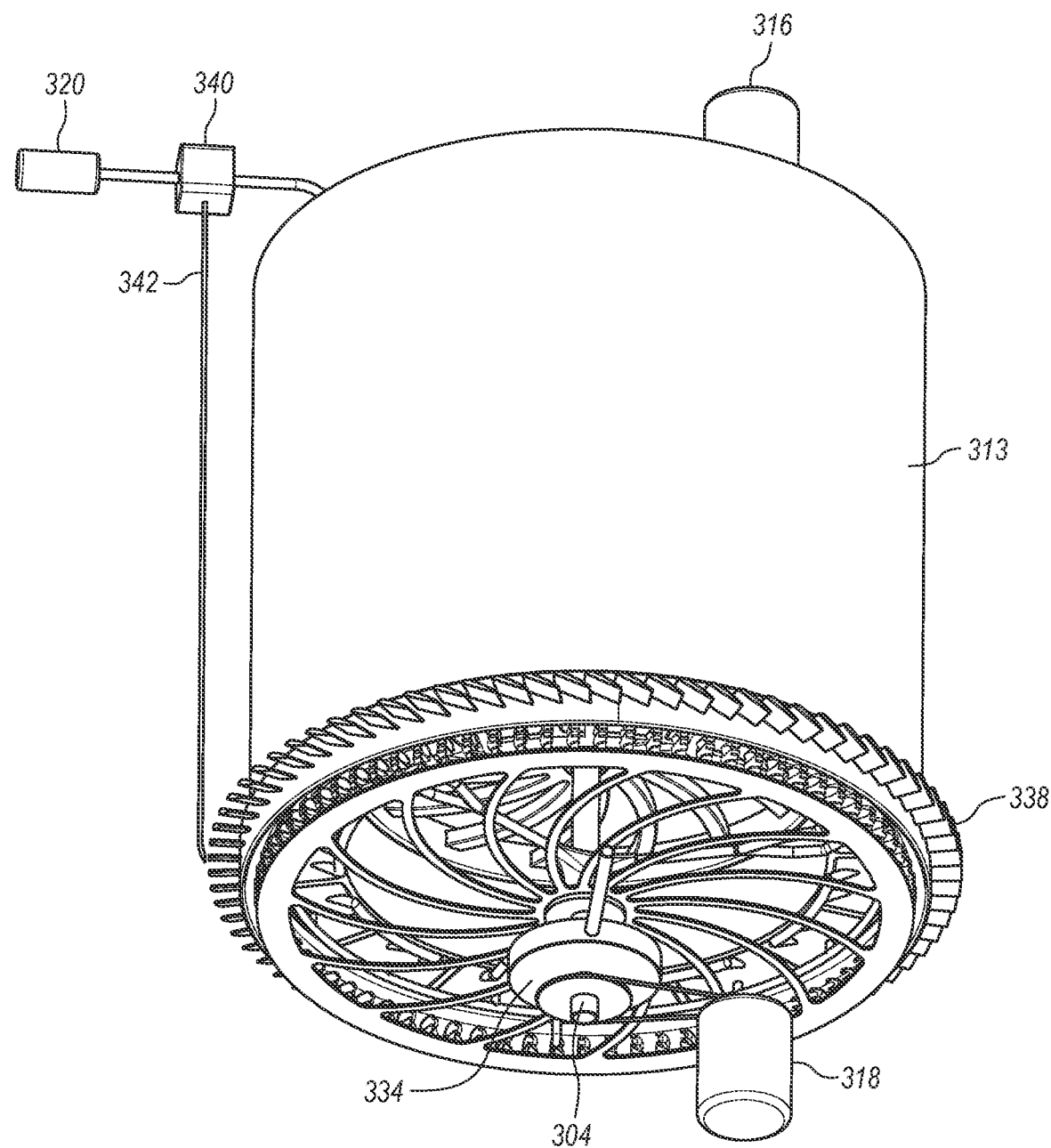
FIG. 22 illustrates a bottom perspective view of a reverse osmosis centrifuge with a housing removed.
Figure 23:
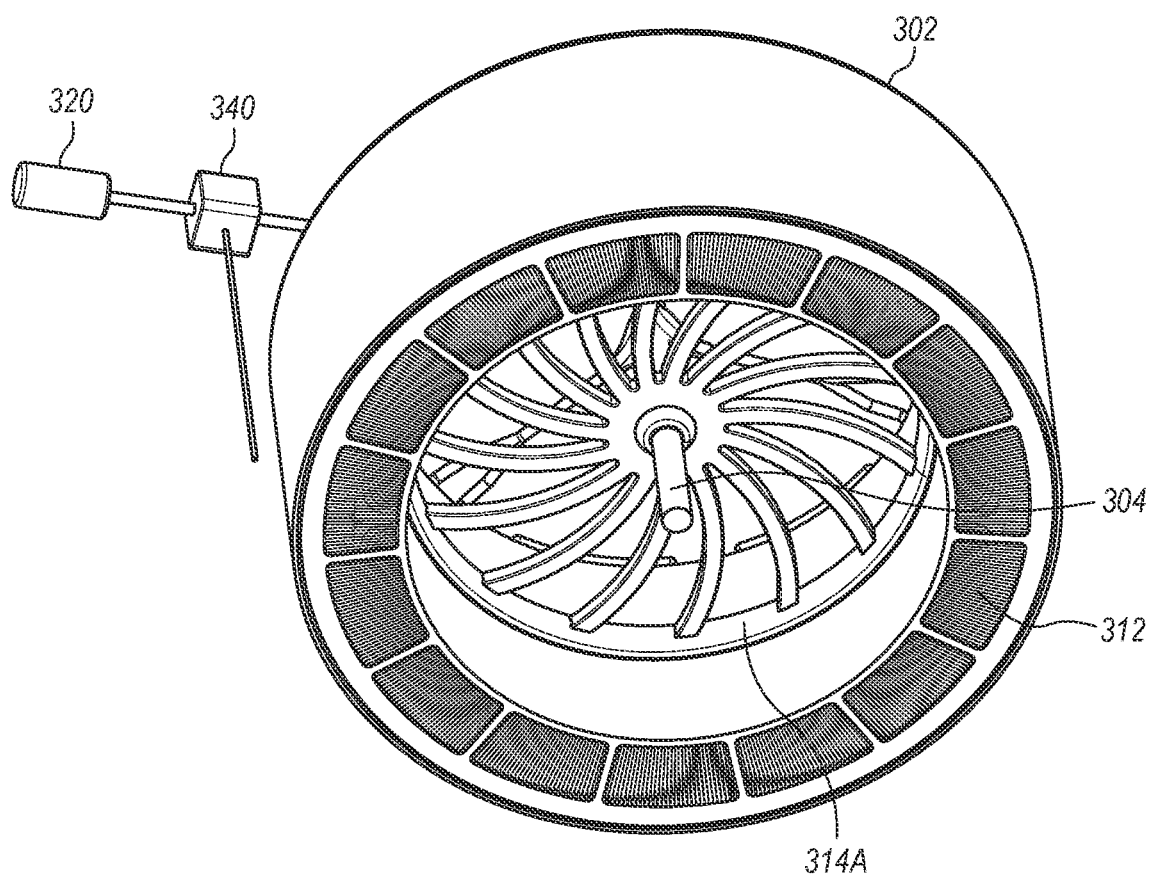
FIG. 23 illustrates a horizontal cross-section of a reverse osmosis centrifuge.

The freshwater is then collected at the bottom basin area 332 of the cylindrical housing 302 (within the vacuum chamber 303). From there, a freshwater pump 334 (e.g., sump pump) may pump the freshwater out via a freshwater line 336 (FIG. 17).

An inevitable effect of the partial vacuum environment in the vacuum chamber 303 is the accumulation of water vapors in the air. This can happen naturally due to evaporation (which accelerates as a function of the vacuum) or due to the mechanical misting of the water as it is pumped out of the membrane cylinder 313. Vapors in the air can negatively affect the performance of the vacuum pump 320. If moisture in the vacuum chamber 303 is not collected before the vacuum pump 320, the moisture will bind with the lubricating oil, and accelerate the wear. Accordingly, referring back to the vacuum aspects, a vapor turbine 338 is coupled to the exterior of the desalination membranes 312 and spins therewith. As a result, as water vapor from the basin area 332 attempts to rise, it is deflected by the vapor turbine 338, thereby reducing or preventing water vapor from entering into the vacuum pump. In some embodiments, a condenser 340 (e.g., condensing coil) is interposed between the vacuum pump 320 and the vacuum chamber 303 of the cylindrical housing 302, thereby condensing any water vapor before it enters the vacuum pump 320 and redirecting any resulting water back into the vacuum chamber 303 via condenser line 342. By preventing water from entering the vacuum pump 320, the components of the reverse osmosis centrifuge 300 will work properly and will be less prone to failure. In some embodiments, a wet lap seal or other seal may be used to prevent moisture from reaching the vacuum pump 320. In some embodiments, the condenser 340 may be replaced with a centrifugal coalescing filter to reduce moisture saturation of the atmosphere in the vacuum chamber 303. Air is directed through the centrifugal coalescing filter where dried gas exits through an inboard radial position. The dried air then enters the vacuum pump 320 where it is pumped out of the chamber to the atmosphere. The remaining liquid water condenses and collects in the bottom basin area 332.

Figure 24:
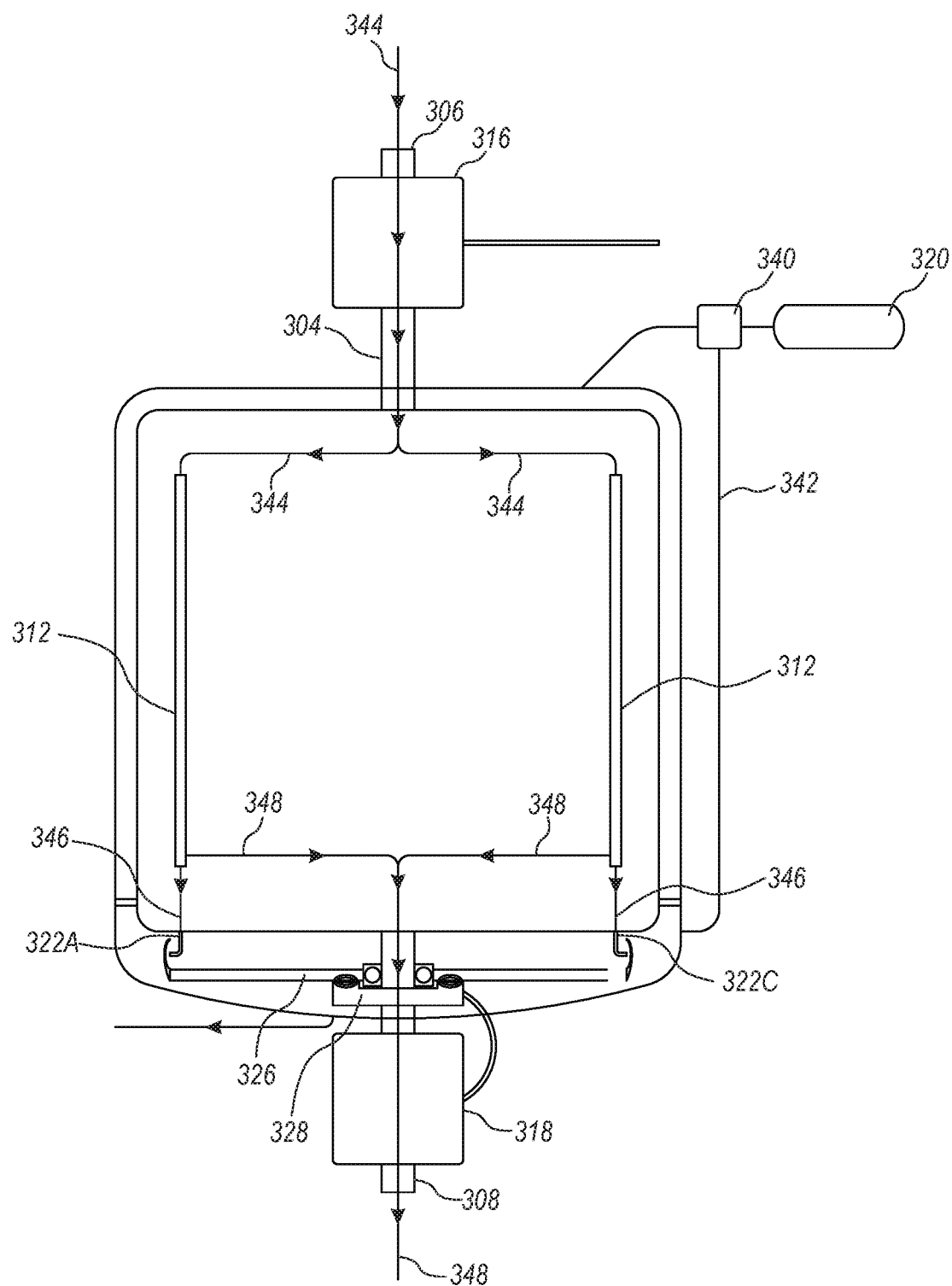
FIG. 24 is a diagram illustrating the flow of water through a reverse osmosis centrifuge.

In one method of use, a user would start the first motor 316 and/or the second motor 318 to begin rotating the driveshaft 304 and the components coupled thereto, including the vertical desalination membranes 312 and vapor turbine 338. As shown in FIG. 24, saltwater 344 is directed into the inlet 306 where gravity and radial forces feed the saltwater 344 into the vertical desalination membranes 312 where the saltwater 344 is separated into freshwater 346 and salt concentrate 348. It will be appreciated that the centrifugal force provides for the pressure required to attain the separation of saltwater 344 into freshwater 346 and concentrate 348 and results in less energy required by the motors 316, 318. As freshwater 346 is ejected out of the freshwater outlets 322A-C, the water makes contact with, and spins, the energy recovery turbine 326. The mechanical energy from the energy recovery turbine 326 is converted to electrical energy, such as via the alternator, where the electricity is then supplied to one of the motors 316, 318, or mechanical energy via a gear train 328. By recapturing energy from the energy recovery turbine 326, less energy is required to continue processing water, increasing efficiency and reducing cost. The salt concentrate 348 flows back to the center axis (i.e., driveshaft 304) via concentrate departure tubes 324A-C (not shown in this diagram), where it exits the concentrate outlet 308. By returning the salt concentrate 348 to the center axis, less energy is lost, allowing the vertical desalination membranes 312 to spin faster with less energy consumption.

In other words, by utilizing centrifugal forces, vacuum chambers, vapor suppression technology, and permeate and concentrate energy recovery components, the reverse osmosis centrifuge 300 is capable of desalinating water using less energy input than desalination systems of the prior art.

Figure 25:
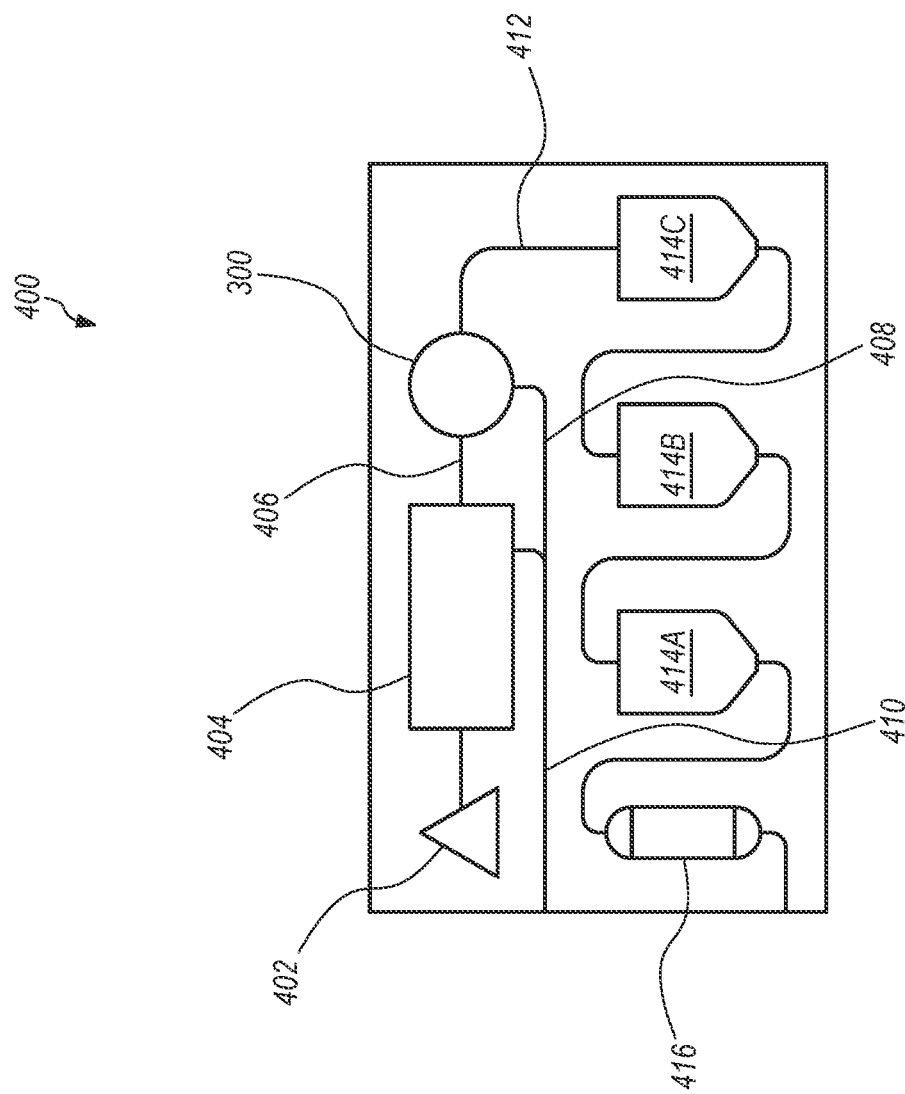
FIG. 25 is a diagram of a system utilizing a reverse osmosis centrifuge.

In some embodiments, as shown in FIG. 25, a system for desalination 400 comprises a feed 402 for a non-centrifugal reverse osmosis system 404 (or other known desalination system of the prior art) and at least one reverse osmosis centrifuge 300 coupled to the waste stream 406 of the reverse osmosis system 404. While waste stream 406 is used as an example, other streams may be used, such as a brine stream, a reject stream, or some combination of streams. Accordingly, the non-centrifugal reverse osmosis system 404 may have a waste stream, a brine stream, a reject stream, or multiple streams. Returning to the reverse osmosis centrifuge 300, this placement allows the reverse osmosis centrifuge 300 to add pressure to the static pressure of the waste stream 406 (or other stream), thus increasing pressure and recovery efficiently. In the system 404, the hydraulic connection between the membranes and the pressure exchangers is pressurized by the main feed pump of the plant, which can vary based on salt concentration. By attaching the reverse osmosis centrifuge 300 to this hydraulic line, the static pressure of the reverse osmosis centrifuge 300 matches the system pressure of the non-centrifugal reverse osmosis system 404. When the reverse osmosis centrifuge 300 is at nominal RPM, the operating pressure equals the sum of the pressure generated by the non-centrifugal reverse osmosis system 404 and the centripetal accelerations generated by the reverse osmosis centrifuge 300. For example, if the static pressure of the non-centrifugal reverse osmosis system 404 is 800 psi, and the reverse osmosis centrifuge 300 generates an additional 800 psi, the new process pressure will be 1600 psi. An additional benefit of this configuration is the waste stream pressure matches the pressure at the inlet (minus the head loss of the reverse osmosis centrifuge 300). This allows downstream devices to operate under the same conditions prior to the placement of the reverse osmosis centrifuge 300.

The freshwater stream 408 from the reverse osmosis centrifuge 300 is combined with the freshwater stream 410 of the reverse osmosis system 404. The waste stream 412 (e.g., salt concentrate/brine solution) exits the reverse osmosis centrifuge 300 and is collected in one or more holding tanks 414A-C. In some embodiments, a separator 416 utilizes Molecular Recognition Technology to separate and collect desired elements from the waste stream 412. Because the waste stream 412 volume is minimized as a result of the reverse osmosis centrifuge 300, the economics of using Molecular Recognition Technology (MRT) for "brine mining" are viable.

For example, brine mining comprises inserting desired MRT molecules into multiple holding tanks to bind with a desired element/ion. Water continuously flows through each holding tank and is stripped of the desired elements via the MRT molecules. As the molecules bind with each other, more MRT molecules must be added so that more wastewater entering the system can be processed. This can be done via an automated dosing system. Once a certain number of molecules have been bound in a given tank, solvent extraction, ion resin exchange, or precipitation can be used to harvest the materials.

Figure 26:
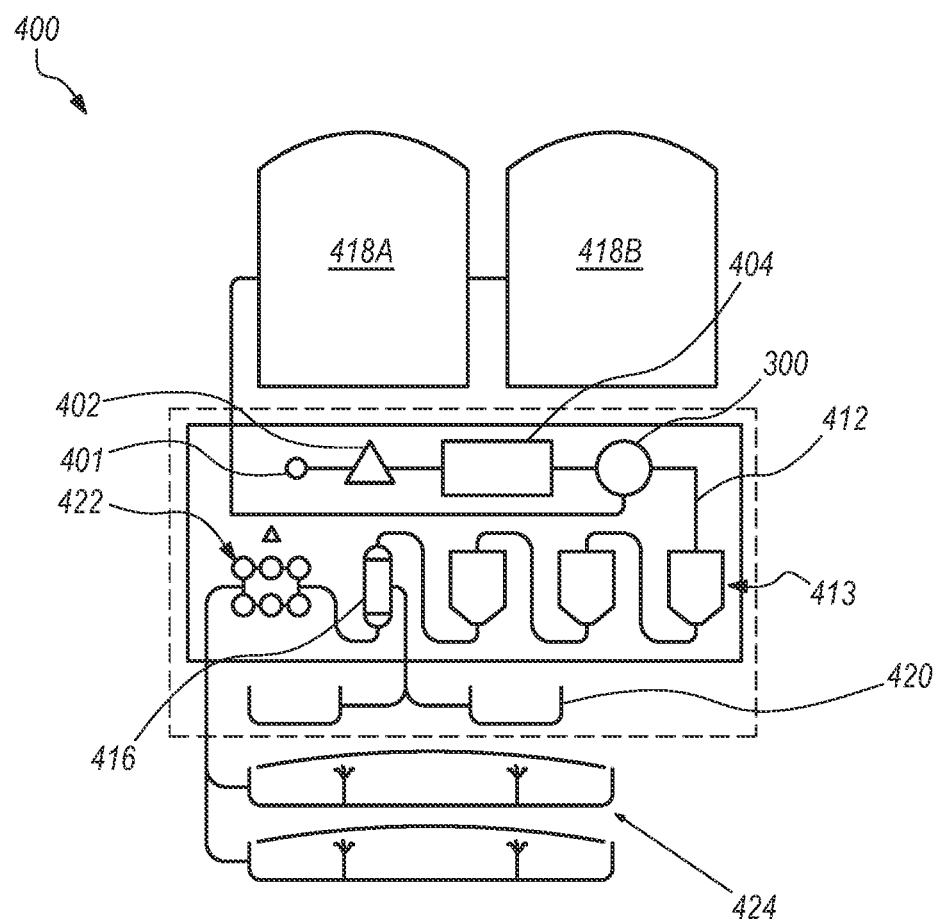
FIG. 26 is a diagram of system utilizing a reverse osmosis centrifuge.

As shown in FIG. 26, the system for desalination 400 may further comprise one or more freshwater holding tanks 418A-B. For example, a water source 401 may be pretreated at 402 before entering a non-centrifugal reverse osmosis system 404 and then the reverse osmosis centrifuge 300. Additionally, the waste stream 412 passes from at least one reverse osmosis centrifuge 300 through the holding tanks configured as a series 413, and a separator 416 (e.g., cartridge filter). As described earlier, MRT may be utilized as the waste stream 412 flows through the series 413 (e.g., tanks 414A-C) and separator 416, where elements (e.g., heavy metal ions) may be extracted. Toxic substances flow into toxic ponds 420 from the separator 416. The permeate from the separator 416 then goes through an ion-resin exchanger 422. From there, any resulting freshwater is redirected to the holding tanks 418A-B with the remaining solution being redirected to one or more collection ponds 424.

By coupling at least one reverse osmosis centrifuge 300 to a prior art desalination system 404, the efficiency of the desalination is greatly increased with little additional energy consumption. This is extremely beneficial for desalination plants that may not have additional space or energy for expanding with traditional desalination systems of the prior art. In contrast, a desalination plant may integrate a reverse osmosis centrifuge 300 to their current system with little impact, overcoming problems in the prior art. In some embodiments, a system may comprise a plurality of reverse osmosis centrifuges 300. If connected in parallel, redundancy is ensured. In some embodiments, the reverse osmosis centrifuge 300 treats water ranging from 35,000 total dissolved solids (TDS) to 250,000 TDS.

The design of an "off the shelf" spiral wound membrane element must be considered when designing a reverse osmosis centrifuge. The size of the centrifuge must scale and increase along the axis of rotation, which suggests a vertical membrane orientation to be suitable. This orientation, however, may increase the negative effects of concentration polarization on the membrane surfaces facing the axis of rotation. In other words, the heavier salt particles are drawn to the outer radial positions and collect on the membrane surfaces or housing walls. On these membrane surfaces, permeate production may be reduced by up to 95%.

Figure 27:
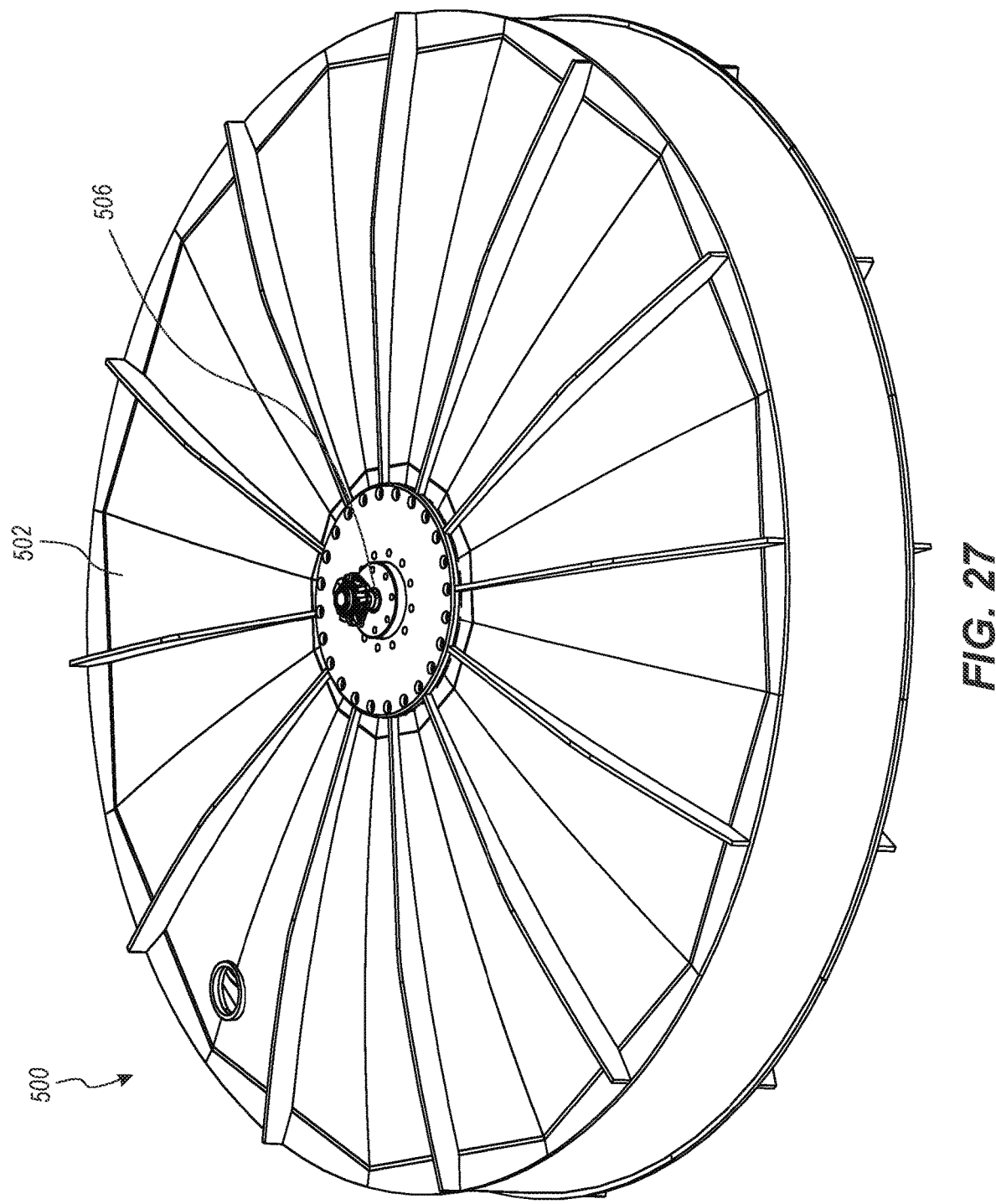
FIG. 27 is a top, perspective view of a reverse osmosis centrifuge.
Figure 28:
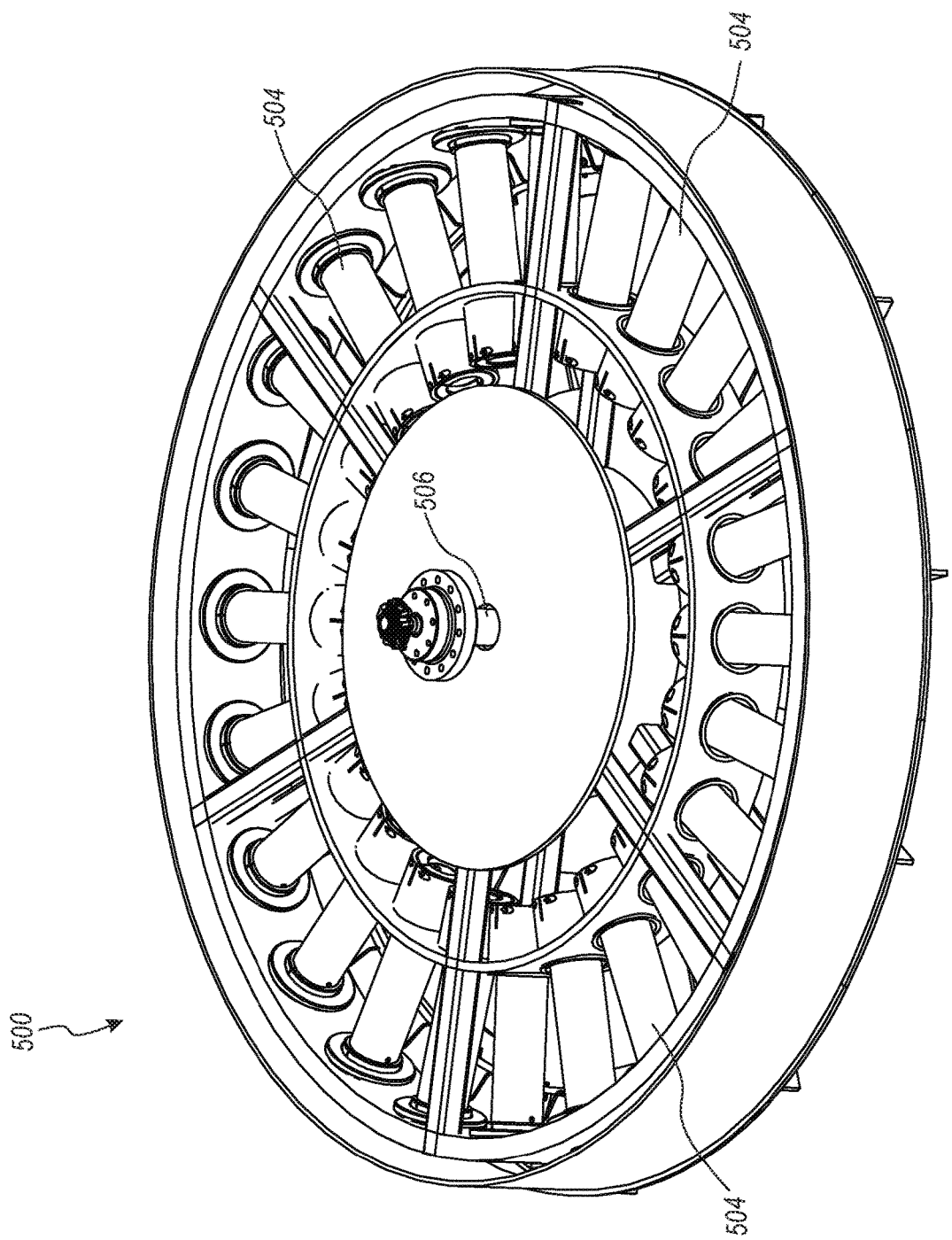
FIG. 28 is a top, perspective view of a reverse osmosis centrifuge with a portion of the housing removed.
Figure 29:
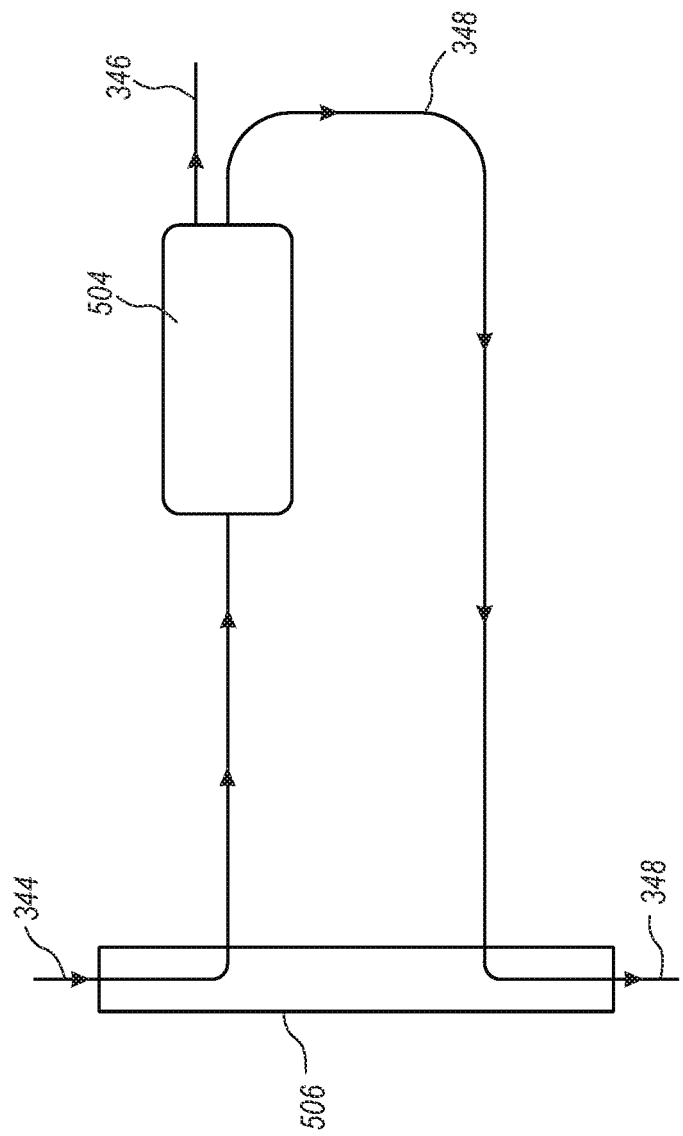
FIG. 29 illustrates the flow of water through the reverse osmosis centrifuge of FIGS. 27-28.

Therefore, in some embodiments, by adopting a horizontal orientation for the membranes, as illustrated in FIGS. 27-29, the effects of centrifugal force on the salt particles can be made a beneficial effect. For example, in some embodiments, a reverse osmosis centrifuge 500 comprises a housing 502 (forming a vacuum chamber) having a plurality of desalination membranes 504 that extend radially from the axis of rotation of a driveshaft 506. As a result, the heavier "fouling" particles are drawn from the membrane surface into the concentrate stream. This principle allows for the recovery of the overall reverse osmosis process to be greatly increased. In this orientation, the membranes 504 are also much more resilient to the effects of centrifugal forces. It will be appreciated that this embodiment comprises components disclosed in other embodiments, although they may not be visible and labeled. FIG. 29 illustrates the flow of saltwater 344 into the axis of rotation, where it follows centrifugal forces radially outwardly to the membranes 504, where the saltwater 344 is separated into freshwater 346 and concentrate 348, the concentrate being returned to the axis of rotation to recover energy.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A desalination system, comprising:
   a non-centrifugal reverse osmosis system comprising a freshwater outlet stream and a reject stream; and
   a reverse osmosis centrifuge comprising:
      a stationary cylindrical housing comprising a vacuum chamber,
      an inlet,
      a driveshaft extending along a central axis of the stationary cylindrical housing,
      a membrane cylinder comprising a central axis that is colinear with the stationary cylinder central axis, a cylindrical outer wall spaced apart from and adjacent to the stationary cylindrical, and a cylindrical inner wall spaced apart from the outer wall such that the membrane cylinder comprises a central cavity and a membrane cavity radially surrounding the central cavity,
      a plurality of desalination membranes positioned in the membrane cavity between the membrane cylinder outer wall and the membrane cylinder inner wall,
      a plurality of support arms extending in the membrane cylinder central cavity between the membrane cylinder inner wall and the driveshaft,
      a vapor turbine coupled to an exterior of the membrane cylinder, the vapor turbine comprising a plurality of turbine blades extending radially outward beyond the membrane cylinder outer wall,
      a freshwater outlet stream, and
      a reject outlet stream;
   wherein the reject stream of the non-centrifugal reverse osmosis system is hydraulically coupled to and feeds into the inlet of the reverse osmosis centrifuge at a first pressure, the reverse osmosis centrifuge configured to increase hydraulic pressure within the housing to a second, higher pressure for further separating the reject stream of the non-centrifugal reverse osmosis system into a freshwater outlet stream and a reject outlet stream, wherein the reject outlet stream exits at the first pressure; and
   wherein the freshwater outlet stream of the reverse osmosis centrifuge is coupled to the freshwater outlet stream of the non-centrifugal reverse osmosis system.

2. The desalination system of claim 1, comprising a plurality of holding tanks configured in a series.

3. The desalination system of claim 2, further comprising Molecular Recognition Technology.

4. The desalination system of claim 1, comprising an ion-resin exchange.

5. The desalination system of claim 1, further comprising a separator and at least one toxic pond.

6. The desalination system of claim 1, further comprising at least one waste stream pond.

7. The desalination system of claim 1, configured to treat water ranging from 35,000 to 250,000 total dissolved solids.

8. The desalination system of claim 1, wherein the plurality of desalination membranes extending radially relative to the membrane cylinder central axis.

9. A desalination system, comprising:
   a non-centrifugal reverse osmosis system comprising a freshwater outlet stream and a reject stream; and
   a reverse osmosis centrifuge coupled to the non-centrifugal reverse osmosis system reject stream, the revers osmosis centrifuge comprising:

a stationary housing comprising a vacuum chamber;

a membrane cylinder comprising a central axis, a cylindrical outer wall spaced apart from and adjacent to the stationary cylindrical, and a cylindrical inner wall spaced apart from the outer wall such that the membrane cylinder comprises a central cavity and a membrane cavity radially surrounding the central cavity, the membrane cylinder sized so as to be rotatable within the vacuum chamber of the stationary housing;

a plurality of desalination membranes positioned in the membrane cavity between the membrane cylinder outer wall and the membrane cylinder inner wall;

a driveshaft coupled to the membrane cylinder inner wall via a plurality of support arms;

a first motor coupled to a first end of the driveshaft;

a second motor coupled to a second end of the driveshaft;

the driveshaft comprising the inlet at the first end and the waste stream outlet at the second end;

a plurality of receiving tubes, each coupled, at a first end, to the inlet and extending radially therefrom where each is coupled, at a second end, to the membrane cylinder;

a plurality of receiving tubes coupled to, and extending radially from, the inlet, the receiving tubes coupled to a first end of each of the plurality of desalination membranes;

a plurality of freshwater outlets coupled to a second end of the desalination membranes;

an energy recovery turbine positioned to receive freshwater from the plurality of freshwater outlets, the energy recovery turbine rotatably coupled to the driveshaft so as to be independently rotatable thereon;

a plurality of concentrate departure tubes, each having a first end coupled to the second end of the desalination membranes, and a second end of each of the plurality of concentrate tubes coupled to the waste stream outlet of the driveshaft;

a freshwater pump configured to pump freshwater out of the vacuum chamber via the freshwater outlet stream;

a vacuum pump coupled to, and in communication with, the vacuum chamber and a vapor turbine coupled to an exterior of the membrane cylinder, the vapor turbine comprising a plurality of turbine blades extending radially outward beyond the membrane cylinder outer wall.

10. The desalination system of claim 9, wherein the support arms comprise at least a partial spiral shape.

11. The desalination system of claim 1, wherein the reverse osmosis centrifuge further comprises a plurality of desalination membranes extending concentrically relative to the membrane cylinder central axis.

12. The desalination system of claim 1, wherein the membrane cavity comprises a plurality of sub-cavities.

13. The desalination system of claim 12, wherein a first sub-cavity of the plurality of sub-cavities is divided from an adjacent sub-cavity of the plurality of sub-cavities by a radially extending dividing wall.

14. The desalination system of claim 13, wherein the dividing wall extends from the membrane cavity outer wall to the membrane cavity inner wall.

15. The desalination system of claim 13, wherein the first sub-cavity and the adjacent sub-cavity are divided only by the radially extending dividing wall.

16. The desalination system of claim 12, wherein each sub-cavity of the plurality of sub-cavities has a curvature that matches the curvature defined by a curvature of the membrane cavity outer wall and the membrane cavity inner wall.

17. The desalination system of claim 12, wherein the entirety of the membrane cavity is divided into a plurality of sub-cavities by a plurality of radially extending dividing walls.

18. The desalination system of claim 17, wherein each sub-cavity of the plurality of sub-cavities contains a portion of the plurality of desalination membranes.

19. The desalination system of claim 1, wherein the reverse osmosis centrifuge further comprising a vacuum pump coupled to, and in communication with, the vacuum chamber.

20. The desalination system of claim 19, wherein the vapor turbine reduces water vapor entering the vacuum pump.

* * * * *